(12) United States Patent
Bando

(10) Patent No.: US 9,893,751 B2
(45) Date of Patent: Feb. 13, 2018

(54) ANTENNA CIRCUIT, COMMUNICATION DEVICE, AND COMMUNICATION METHOD FOR IMPROVING RECEPTION SIGNAL QUALITY

(75) Inventor: Hiroshi Bando, Tokyo (JP)

(73) Assignee: Sony Corporation, Tokyo (JP)

( * ) Notice: Subject to any disclaimer, the term of this patent is extended or adjusted under 35 U.S.C. 154(b) by 200 days.

(21) Appl. No.: 13/617,590

(22) Filed: Sep. 14, 2012

(65) Prior Publication Data

US 2013/0095771 A1    Apr. 18, 2013

(30) Foreign Application Priority Data

Oct. 14, 2011   (JP) .................. 2011-226411

(51) Int. Cl.
*H04B 1/38* (2015.01)
*H04B 1/18* (2006.01)
*H04B 1/04* (2006.01)

(52) U.S. Cl.
CPC ............. *H04B 1/18* (2013.01); *H04B 1/0458* (2013.01)

(58) Field of Classification Search
CPC ....... H04B 1/0458; H04B 1/18; H04B 5/0081
USPC .................................................. 455/73, 41.1
See application file for complete search history.

(56) References Cited

U.S. PATENT DOCUMENTS

| 6,542,128 | B1 * | 4/2003 | Johnson et al. ............. 343/742 |
| 2004/0009754 | A1 * | 1/2004 | Smith, Jr. ........................ 455/82 |
| 2007/0010217 | A1 * | 1/2007 | Takahashi ............. H01Q 1/245 455/121 |
| 2009/0224893 | A1 * | 9/2009 | Kondo et al. ............. 340/10.51 |
| 2010/0244580 | A1 * | 9/2010 | Uchida et al. ................ 307/104 |
| 2010/0321128 | A1 * | 12/2010 | Merlin ................. G06K 7/0008 333/112 |
| 2012/0083205 | A1 * | 4/2012 | Marcu .................. G06K 7/0008 455/41.1 |

FOREIGN PATENT DOCUMENTS

JP        2004-235884       8/2004

* cited by examiner

*Primary Examiner* — Yuwen Pan
*Assistant Examiner* — Fatuma Sherif
(74) *Attorney, Agent, or Firm* — Chip Law Group

(57) ABSTRACT

An antenna circuit which includes, a resonant circuit which is configured by at least first and second capacitors, and antenna coils; a transmitter-receiver circuit which has a transmission terminal and a reception terminal; and an adjustment circuit which adjusts an impedance between the resonant circuit and the transmitter-receiver circuit, in which a combination of capacitances of the first and second capacitors is set in a predetermined range of a composite capacitance of the first and second capacitors, and a signal from a terminal which is provided between the first and second capacitors is input to the reception terminal.

7 Claims, 15 Drawing Sheets

ANTENNA CIRCUIT, COMMUNICATION DEVICE, AND COMMUNICATION METHOD FOR IMPROVING RECEPTION SIGNAL QUALITY

BACKGROUND

The present disclosure relates to an antenna circuit, a communication device, and a communication method, and in particular, relates to an antenna circuit, a communication device, and a communication method which are able to improve degradation of communication performance.

A reader/writer in the related art outputs a carrier signal to a non-contact IC card, or a mobile phone when receiving a signal from the non-contact IC card, or the mobile phone. When the non-contact IC card, or the mobile phone performs a load modulation with respect to the carrier signal, an amount of change thereof is extracted from a portion of an antenna circuit which adjusts an impedance, and is input to a reception terminal of a reception circuit of the reader/writer. In this manner, a reception of a signal from the non-contact IC card, or the mobile phone has been performed (for example, refer to Japanese Unexamined Patent Application Publication No. 2004-235884).

Meanwhile, the quality of a signal which is input to a reception circuit is changed depending on a positional relationship between the non-contact IC card, or the mobile phone and an antenna of the reader/writer. The signal quality is determined by a result of an impedance adjustment, and differs depending on a type of card, or the like. The reception circuit of the reader/writer performs decoding based on the signal. However, there has been a case where the decoding is difficult depending on the signal quality, and as a result, a communication distance of the reader/writer shortens, or a communication performance worsens in a certain positional relationship.

On the other hand, it is also possible to perform an antenna adjustment so that the quality of a reception signal becomes good, however, when performing the antenna adjustment, it is difficult to output a magnetic field efficiently from the reader/writer, and as a result, there is a concern that the communication distance may shorten.

SUMMARY

It is desirable to improve a degradation of a communication performance.

According to an embodiment of the present disclosure, there is provided an antenna circuit which includes, a resonant circuit which is configured by at least first and second capacitors, and antenna coils; a transmitter-receiver circuit which includes a transmission terminal and a reception terminal; and an adjustment circuit which adjusts an impedance between the resonant circuit and the transmitter-receiver circuit, in which a combination of capacitances of the first and second capacitors is set in a predetermined range of a composite capacitance of the first and second capacitors, and a signal from a terminal which is provided between the first and second capacitors is input to the reception terminal.

According to another embodiment of the present disclosure, there is provided a communication device which includes an antenna circuit including, a transmitter-receiver circuit having a transmission terminal and a reception terminal; a resonant circuit which is configured by at least first and second capacitors, and antenna coils; an adjustment circuit which adjusts an impedance between the resonant circuit and the transmitter-receiver circuit, in which a combination of capacitances of the first and second capacitors is set in a predetermined range of a composite capacitance of the first and second capacitors, and a signal from a terminal, which is provided between the first and second capacitors, is input into the reception terminal.

According to further another embodiment of the present disclosure, there is provided a communication method using an antenna circuit which includes a transmitter-receiver circuit having a transmission terminal and a reception terminal; a resonant circuit which is configured by at least first and second capacitors, and antenna coils; and an adjustment circuit which adjusts an impedance between the resonant circuit and the transmitter-receiver circuit, the method including, setting a combination of capacitances of the first and second capacitors in a predetermined range of a composite capacitance of the first and second capacitors, and inputting a signal from a terminal which is provided between the first and second capacitors to the reception terminal.

According to the embodiments of the present disclosure, a combination of capacitances of first and second capacitors in a resonant circuit is set in a predetermined range of a composite capacitance of the first and second capacitors. In addition, a signal from a terminal, which is provided between the first and second capacitors, is input to a reception terminal.

According to the embodiments of the present disclosure, it is possible to perform a communication, and in particular, it is possible to improve degradation of communication performance.

DETAILED DESCRIPTION OF EMBODIMENTS

Figure 1:
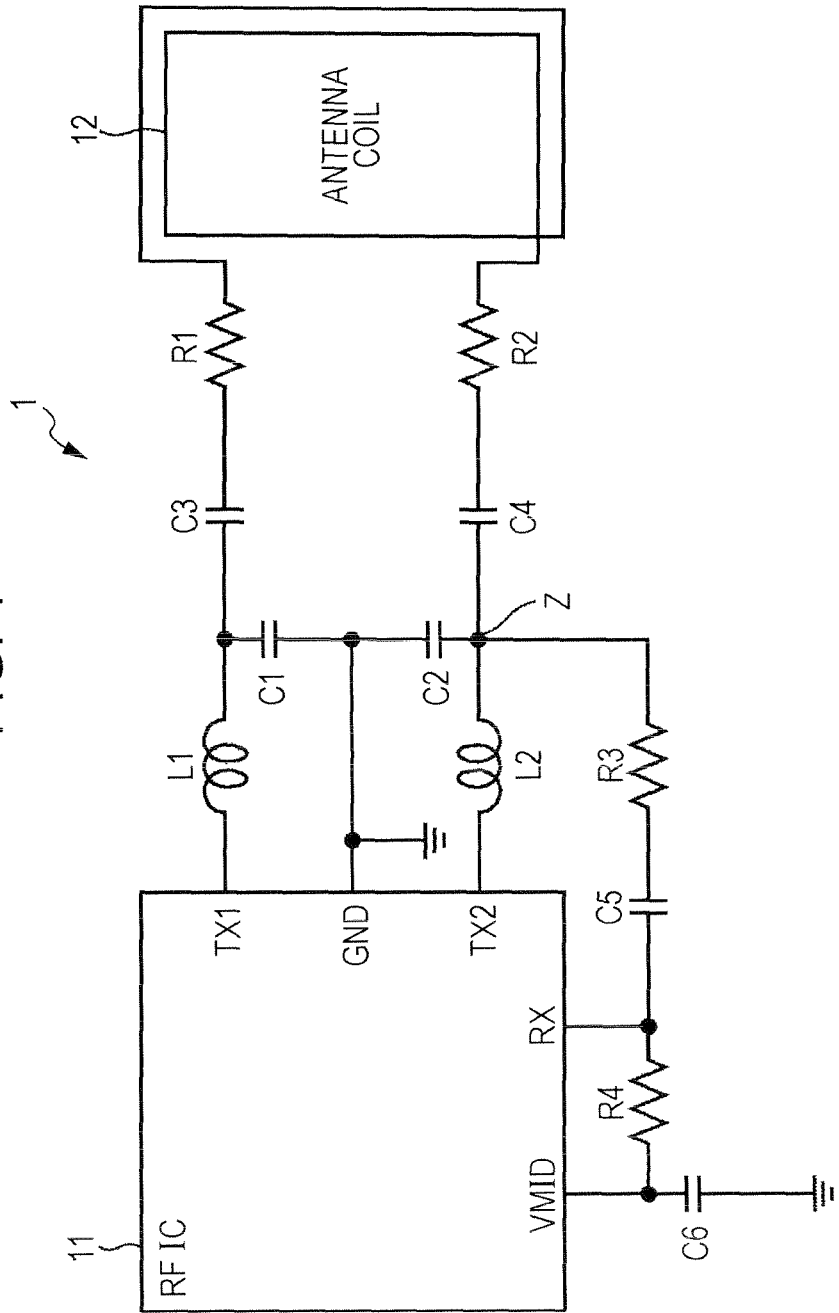
FIG. 1 is a block diagram which shows a configuration example of a reader/writer in the related art.

Hereinafter, embodiments of the present disclosure (hereinafter, referred to as embodiments) will be described. In addition, descriptions will be made in the following order.
1. First Embodiment (Communication System of Reader/Writer and Non-Contact IC Card)
2. Second Embodiment (Communication System of NFC Device)
1. First Embodiment
Circuit Configuration Example of Reader/Writer in the Related Art For a comparison with the present disclosure, a circuit configuration example of a reader/writer in the related art will be described with reference to FIG. 1. FIG. 1 shows the circuit configuration example of the reader/writer in the related art.

A reader/writer 1 in the related art transmits a carrier signal to a non-contact IC card which is not shown. Since the non-contact IC card replies to the reader/writer 1 using a load modulation, the reader/writer 1 receives a signal from the non-contact IC card by obtaining an amount of change due to the load modulation.

The reader/writer 1 is configured by including an RFIC (Radio Frequency Integrated Circuit) 11, coils L1 and L2, capacitors C1 to C5, resistances R1 to R4, an antenna coil 12, or the like.

The RFIC 11 includes transmission terminals TX1 and TX2, a ground terminal GND, a reception terminal RX, and a middle point potential terminal VMID. The RFIC 11 includes a transmission circuit and a reception circuit which are not shown, and the transmission terminals TX1 and TX2 are terminals which output a signal from a transmission circuit. The reception terminal RX is a terminal which inputs a signal to a reception circuit.

One end of the coils L1 and L2 is connected to the transmission terminals TX1 and TX2, respectively. The ground terminal GND is grounded. One end of the capacitor C1 and one end of the capacitor C3 are connected to the other end of the coil L1. One end of the capacitor C2 and one end of the capacitor C4 are connected to the other end of the coil L2. The ground terminal GND and the other end of the capacitor C2 are connected to the other end of the capacitor C1.

The coils L1 and L2 configure a performance circuit of a LPF (Low Pass Filter), and of performing impedance conversion along with the capacitors C1 and C2.

The other end of the capacitor C3 is connected in series to one end of the antenna coil 12 through the resistance R1. The other end of the capacitor C4 is connected in series to the other end of the antenna coil 12 through the resistance R2. The capacitors C3 and C4 configure a resonant circuit along with the antenna coil 12. In addition, the capacitors C1 and C2 also aid resonance.

The resistances R1 and R2 adjust a Q Factor (quality factor) of the resonance circuit.

The reception terminal RX of the RFIC 11 inputs a signal from a terminal Z which is provided at an intersection point to which one end of the capacitor C4, one end of the capacitor C2, and the other end of the coil L2 are connected through the resistance R3 and the capacitor C5.

When a level of the signal from the terminal Z is large, the resistance R3 performs processing of adjusting the level by changing a voltage dividing ratio along with the resistance R4. The capacitor C5 cuts the signal from the terminal Z (signal from the transmission terminal TX2), and a difference in a signal from the middle point potential terminal VMID is cut in a direct current manner.

The middle point potential terminal VMID is grounded through a capacitor C6. The capacitor C6 is a bypass capacitor for stabilizing a middle point potential. The middle point potential terminal VMID generates the middle point potential, and supplies thereof through the resistance R4. The reception circuit decodes the signal which is input from the reception terminal RX based on the middle point potential of the middle point potential terminal VMID.

In the reader/writer 1 in the related art which is configured as above, a quality of the signal input to the reception circuit has been determined by a result of the impedance adjustment.

The reception circuit of the reader/writer 1 performs the decoding based on the signal which is input from the reception terminal RX, however, there is a case where the decoding is difficult depending on the quality of the signal, and as a result, there has been a case where a communication performance is worsened when a communication distance of the reader/writer 1 is dropped, or in a certain positional relationship.

On the other hand, when the antenna adjusting is performed so as to upgrade the quality of the reception signal, it is difficult to efficiently output a magnetic field from the reader/writer 1, and as a result, the communication distance is dropped.

Therefore, according to the present disclosure, the quality of signal of the reply signal is changed without changing a property of a power supply to the non-contact IC card from the reader/writer 1. Hereinafter, a detailed description will be made.
Configuration Example of Communication System FIG. 2 is a block diagram which schematically shows a configuration of an embodiment of a communication system to which the present disclosure is applied.

Figure 2:
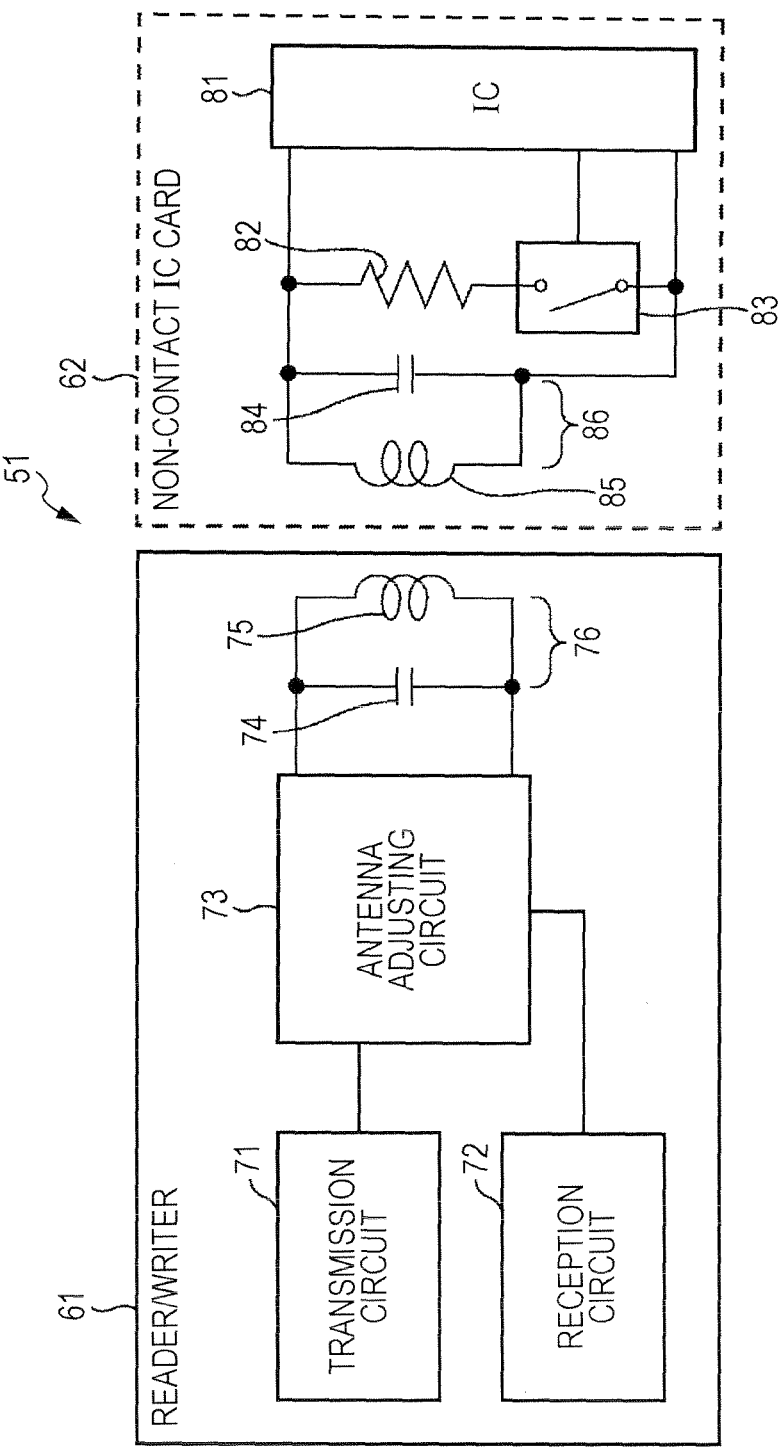
FIG. 2 is a block diagram which shows a configuration example of a communication system to which the present disclosure is applied.

A communication system 51 shown in FIG. 2 is a system in which a non-contact communication is performed between a reader/writer 61 and a facing non-contact IC card 62.

The reader/writer 61 includes a circuit which generates a magnetic field, and transmits a carrier signal to a non-contact IC card 62 by generating the magnetic field. A reply from the non-contact IC card 62 is performed in a load modulation method. The reader/writer 61 receives the signal from the non-contact IC card 62 by obtaining an amount of change due to a load modulation.

The reader/writer 61 is configured by including a transmission circuit 71, a reception circuit 72, an antenna adjusting circuit 73, and a resonance circuit 76 which is configured by a capacitor 74, and an antenna coil 75.

The transmission circuit 71 performs transmitting of the carrier signal to the facing non-contact IC card 62. That is, the transmission circuit 71 forms a magnetic filed by generating an electromagnetic wave by causing a current to flow to the resonance circuit 76 through the antenna adjusting circuit 73. In addition, the transmission circuit 71 transmits data by controlling (modulating) the electromagnetic wave as a carrier wave which is output by the resonance circuit 76.

The reception circuit 72 receives a signal from the non-contact IC card 62 on the opposing side. That is, the reception circuit 72 receives an electric signal from the resonance circuit 76 through the antenna adjusting circuit 73, and performs decoding on the basis of the received signal.

The antenna adjusting circuit 73 is provided between the transmission circuit 71, the reception circuit 72, and the resonance circuit 76, adjusts impedance or the like, and inputs a reply signal from the non-contact IC card 62 to the reception circuit 72.

The resonance circuit 76 is a resonance-type antenna circuit to which the capacitor 74 and the antenna coil 75 are connected in parallel. A resonance frequency of the resonance circuit 76 corresponds to a frequency of the carrier wave, and the resonance circuit 76 outputs the carrier wave (electromagnetic wave). In addition, the resonance circuit 76 combines with a resonance circuit 86 of the non-contact IC card 62, converts a combined electromagnetic field to an electric signal, and supplies thereof to the antenna adjusting circuit 73.

The non-contact IC card 62 is configured by the resonance circuit 86 which is configured by, for example, an IC 81, a resistance 82, a switch 83, a capacitor 84, and an antenna coil 85.

The IC 81 controls a transmission of a signal to the reader/writer 61 on the opposing side, using the load modulation method in which a load of impedance with respect to the antenna coil 85 is changed by an ON-OFF operation of the switch 83.

The resonance circuit 86 is the resonance-type antenna circuit to which the capacitor 84 and the antenna coil 85 are connected in parallel. The resonance circuit 86 is combined with an electromagnetic field which is radiated from the resonance circuit 76 of the reader/writer 61, converts the combined electromagnetic field to an electric signal, and supplies it to the IC 81, or the like.

In addition, in the example in FIG. 2, an example of a communication system with the non-contact IC card 62 is denoted, however, it is not limited to the non-contact IC card, and it may be a mobile phone, or the like.

Configuration Example of Reader/Writer

Figure 3:
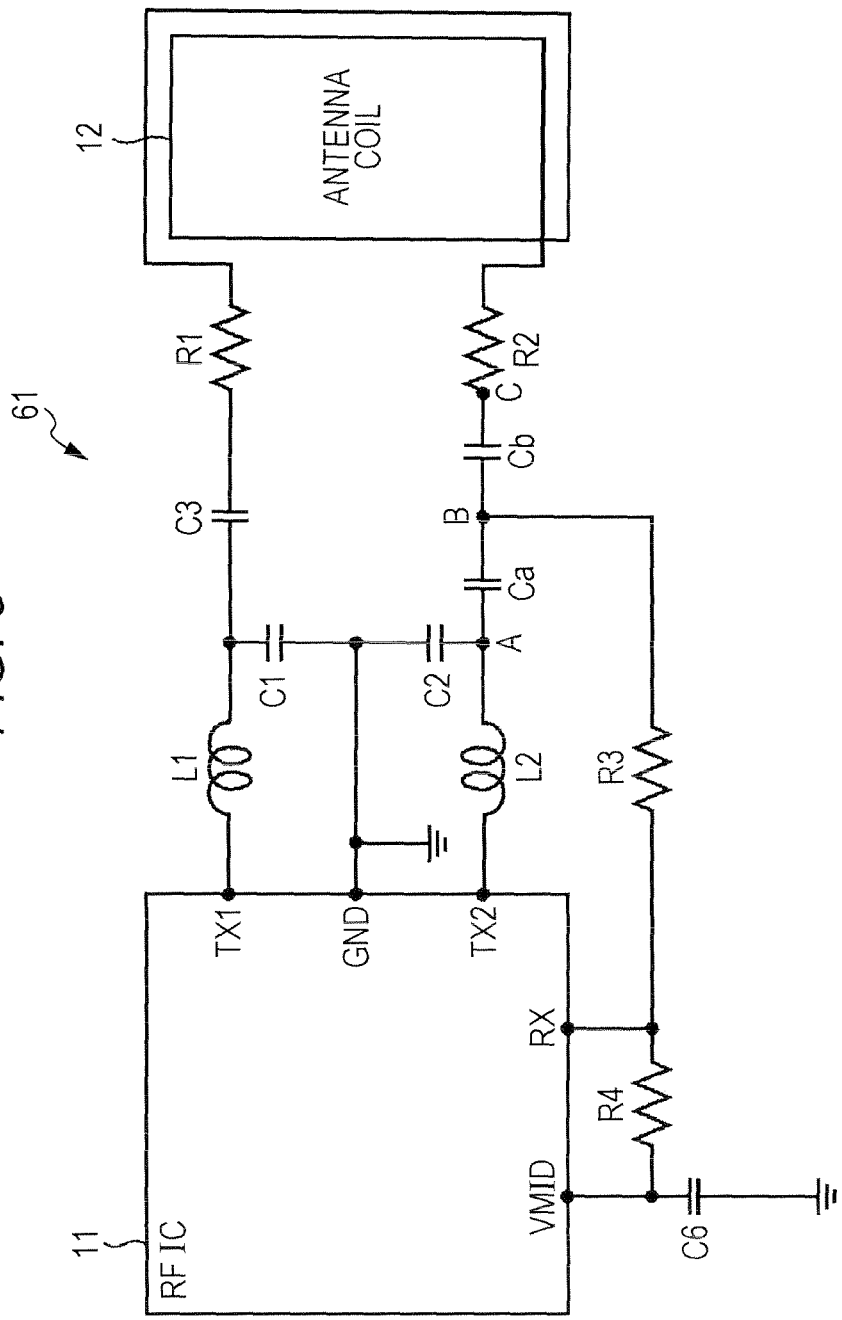
FIG. 3 is a diagram which shows a circuit configuration example of the reader/writer.

FIG. 3 shows a specific circuit configuration example of a reader/writer.

The reader/writer 61 shown in FIG. 3 is configured by including the RFIC (Radio Frequency Integrated Circuit) 11, the coils L1 and L2, and the capacitors C1 to C3. In addition, the reader/writer 61 is configured by including the capacitors Ca, Cb, and C6, the resistances R1 to R4, the antenna coil 12, or the like.

That is, the reader/writer 61 is common to the reader/writer 1 in FIG. 1 in this respect that the reader/writer 61 includes the RFIC 11, the coils L1 and L2, the capacitors C1 to C3, and C6, the resistances R1 to R4, and the antenna coil 12.

On the other hand, the reader/writer 61 is different from the reader/writer 1 in FIG. 1 in this respect that, in the reader/writer 61, the capacitor C4 is replaced by the capacitors Ca and Cb, and the capacitor C5 is omitted.

The RFIC 11 includes the transmission terminals TX1 and TX2, the ground terminal GND, the reception terminal RX, and the middle point potential terminal VMID. In the example in FIG. 3, though it is not shown, the RFIC 11 includes the transmission circuit 71 and the reception circuit 72 in FIG. 2. The transmission terminals TX1 and TX2 are terminals for outputting the signal from the transmission circuit 71. The reception terminal RX is a terminal for inputting the signal to the reception circuit 72.

Transmission terminals TX1 and TX2 are connected with one end of the coils L1 and L2, respectively. The ground terminal GND is grounded. The other end of the coil L1 is connected with one end of the capacitor C1, and one end of the capacitor C3. The other end of the coil L2 is connected with one end of the capacitor C2, and one end of the capacitor Ca. The other end of the capacitor C1 is connected with the ground terminal GND, and the other end of the capacitor C2.

The coils L1 and L2 are circuits having a function of the LPF (Low Pass Filter), and converting impedance along with the capacitor C1 and C2 (that is, corresponding to the antenna adjusting circuit 73 in FIG. 2).

The other end of the capacitor C3 is connected in series to one end of the antenna coil 12 through the resistance R1. The other end of the capacitor Ca is connected to one end of the capacitor Cb. The other end of the capacitor Cb is connected in series to the other end of the antenna coil 12 through the resistance R2. That is, the connection is made in order of the capacitors Ca, Cb, the resistance R2, and the antenna coil 12.

The capacitors C3, Ca, and Cb configure the resonance circuit (that is, that corresponds to the resonance circuit 76 in FIG. 2) along with the antenna coil 12. In addition, the capacitors C1 and C2 also aids the resonance.

The resistances R1 and R2 adjust the Q Factor (quality factor) of the resonance circuit.

The middle point potential terminal VMID is grounded through the capacitor C6. The middle point potential terminal VMID generates a middle point potential, and supplies thereof to the reception terminal RX through the resistance R4.

The reception terminal RX of the RFIC 11 inputs a signal through a resistance R3 from a terminal which is provided at the point B (hereinafter, referred to as the terminal B) which is shown between the capacitor Ca and Cb. That is, in the case, since the signal from the transmission terminal TX2 is not directly input into the reception terminal RX, the capacitor C5 in FIG. 1 is not necessary. When a level of the signal from the point B is large, the resistance R3 performs processing of adjusting the level by changing the voltage dividing ratio along with the resistance R4.

The reception circuit 72 decodes the signal which is input from the reception terminal RX based on the middle point potential of the middle point potential terminal VMID.

In the reader/writer 61 which is configured as above, a composite capacitance of the capacitors Ca and Cb is adjusted to be the same value as that of the capacitor C4 in FIG. 1. In this manner, the same magnetic field intensity as that of the reader/writer 1 in the related art is output from the resonance circuit 76 of the reader/writer 61.

Figure 4:
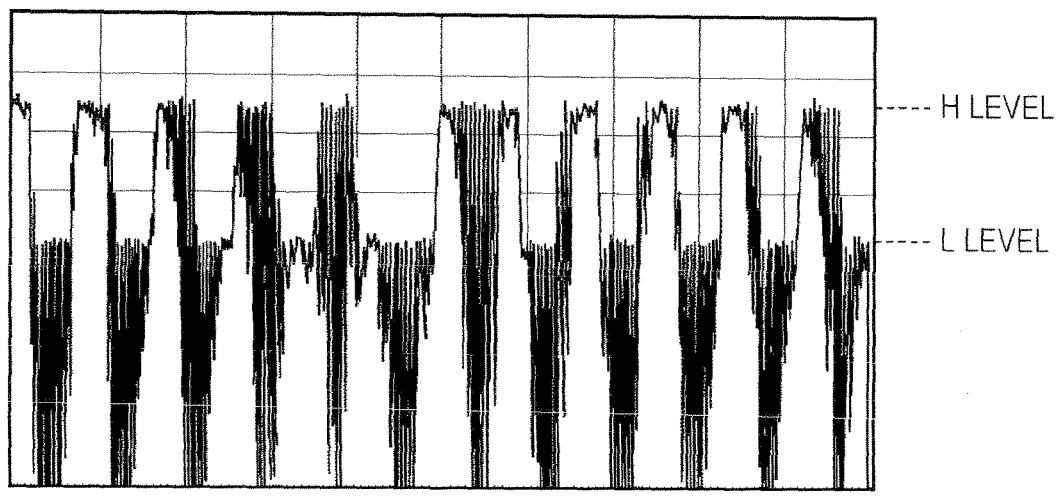
FIG. 4 is a diagram which shows an example of a waveform of a reply signal of a load modulation.
Figure 5:
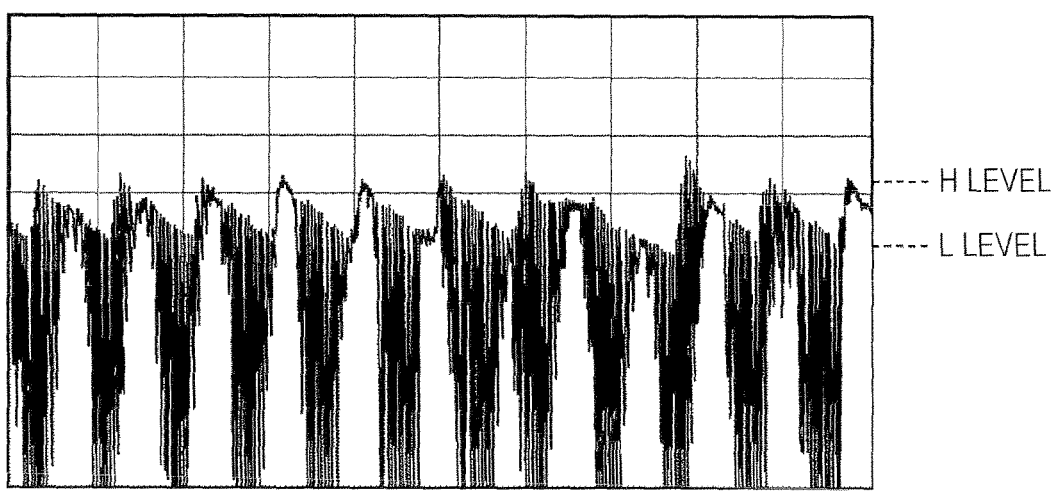
FIG. 5 is a diagram which shows an example of a waveform of a reply signal of a load modulation.

As shown in FIGS. 4 and 5, a waveform of the reply signal from the non-contact IC card 62 is variously changed according to a combination of the resonance circuit 76 of the reader/writer 61 and the resonance circuit 86 of the non-contact IC card 62, or a positional relationship thereof.

FIGS. 4 and 5 show examples of waveforms of a reply signal of the load modulation from the non-contact IC card 62.

There are flat portions in both L level and H level in the waveform of the reply signal shown in FIG. 4. Accordingly, the waveform shown in FIG. 4 can be easily decoded in the reception circuit 72 of the reader/writer 61.

However, the waveform of the reply signal shown in FIG. 5 is sawtooth wave, and it is difficult to determine a point of variation between the L level and H level. In the waveform shown in FIG. 5, when performing decoding in the reception circuit 72 of the reader/writer 61, a duty ratio of the H level and L level is collapsed, accordingly, it is difficult to perform accurate decoding.

As described above, in the reader/writer 61, in order to make the waveform of the reply signal from the non-contact IC card 62 easily received by the reception circuit 72, a combination of a capacitance of the capacitor Ca, and a capacitance of the capacitor Cb is changed in a range of the same value as that of the capacitor C4 in FIG. 1. In addition, the combination of the capacitance of the capacitor Ca, and the capacitance of the capacitor Cb is set as a combination which becomes the optimal reception waveform. In this manner, it is possible to input the optimal reception waveform to the reception circuit 72.

Figure 6:
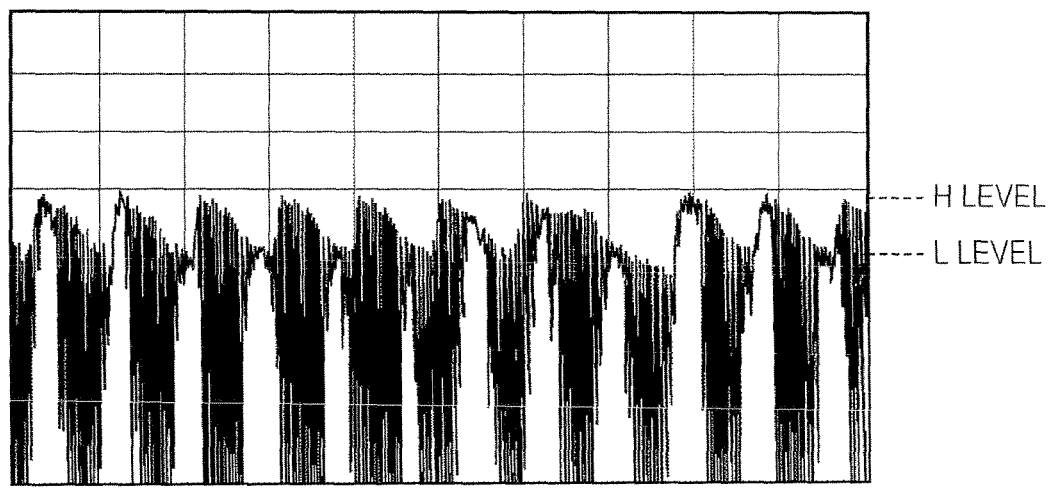
FIG. 6 is a diagram which shows an example of a waveform of a reply signal of a point A.
Figure 7:
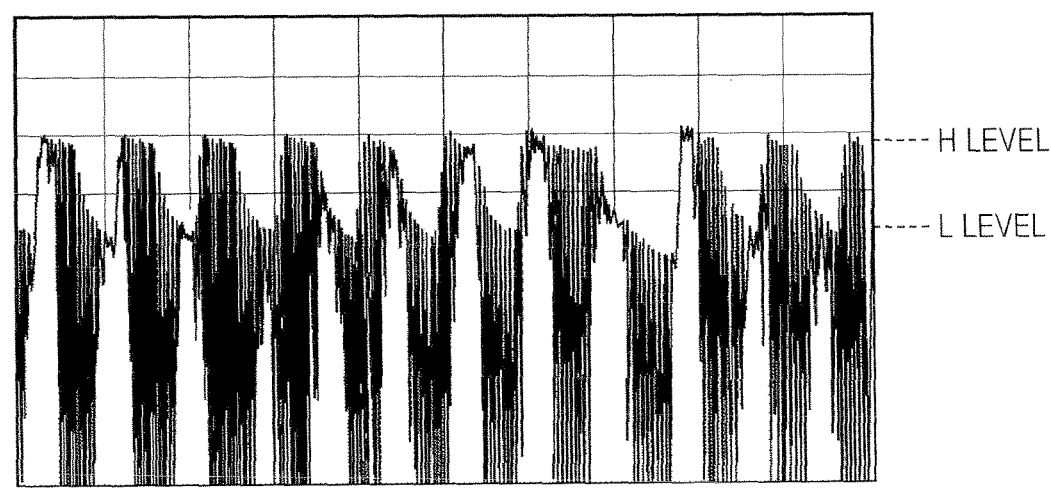
FIG. 7 is a diagram which shows an example of a waveform of a reply signal of a point B.
Figure 8:
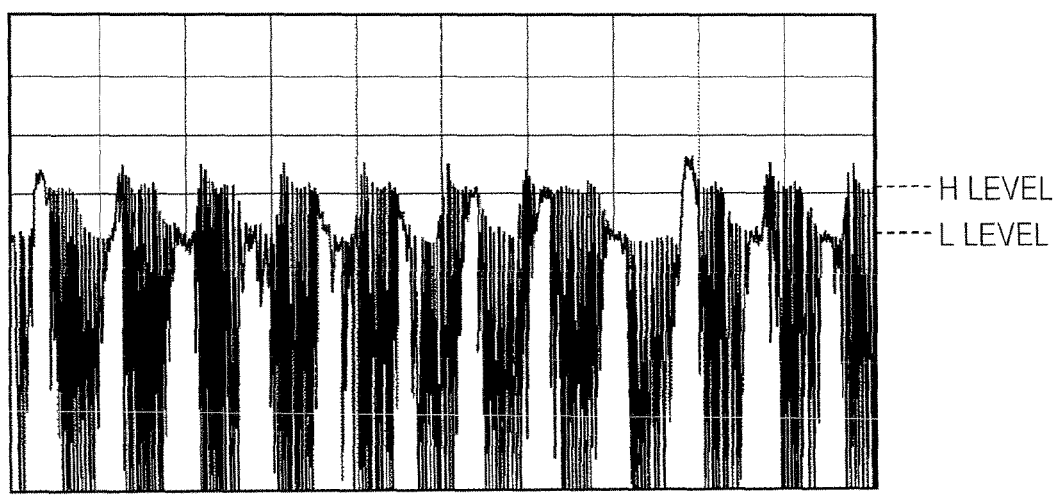
FIG. 8 is a diagram which shows an example of a waveform of a reply signal of a point C.

FIGS. 6 to 8 show examples of waveforms of reply signals in each point A, B, and C which are shown in the reader/writer 61 in FIG. 3. In addition, in the example in FIG. 3, A is an intersection point of the other end of the coil L2, one end of the capacitor C2, and one end of the capacitor Ca. B is a point between the other end of the capacitor Ca and one end of the capacitor Cb. C is a point between the other end of the capacitor Cb and one end of the resistance R2.

The waveform of the reply signal of the point A shown in FIG. 6 is the sawtooth wave, similar to the waveform of the reply signal in FIG. 5, accordingly, it is difficult to determine the point of variation between the L level and H level.

The waveform of the reply signal of the point C shown in FIG. 8 has a large overshoot, accordingly, there is a concern that the reception circuit 72 may not perform accurate decoding at this portion.

In contrast to this, the waveform of the reply signal of the point B shown in FIG. 7 becomes a waveform in which the weak points of the waveforms shown in FIGS. 6 and 7 are improved. That is, the waveform shown in FIG. 8 has flat portions in the H level and L level compared to the waveform shown in FIG. 6, and there is also a difference between the H level and L level. The waveform shown in FIG. 8 does not overshoot much compared to the waveform shown in FIG. 7. Accordingly, the reception circuit 72 can perform the decoding easily.

Accordingly, it is possible to input signals having better waveform to the reception terminal RX, by providing a terminal at the point B, and inputting signals from the provided terminal B to the reception terminal RX.

Figure 9:
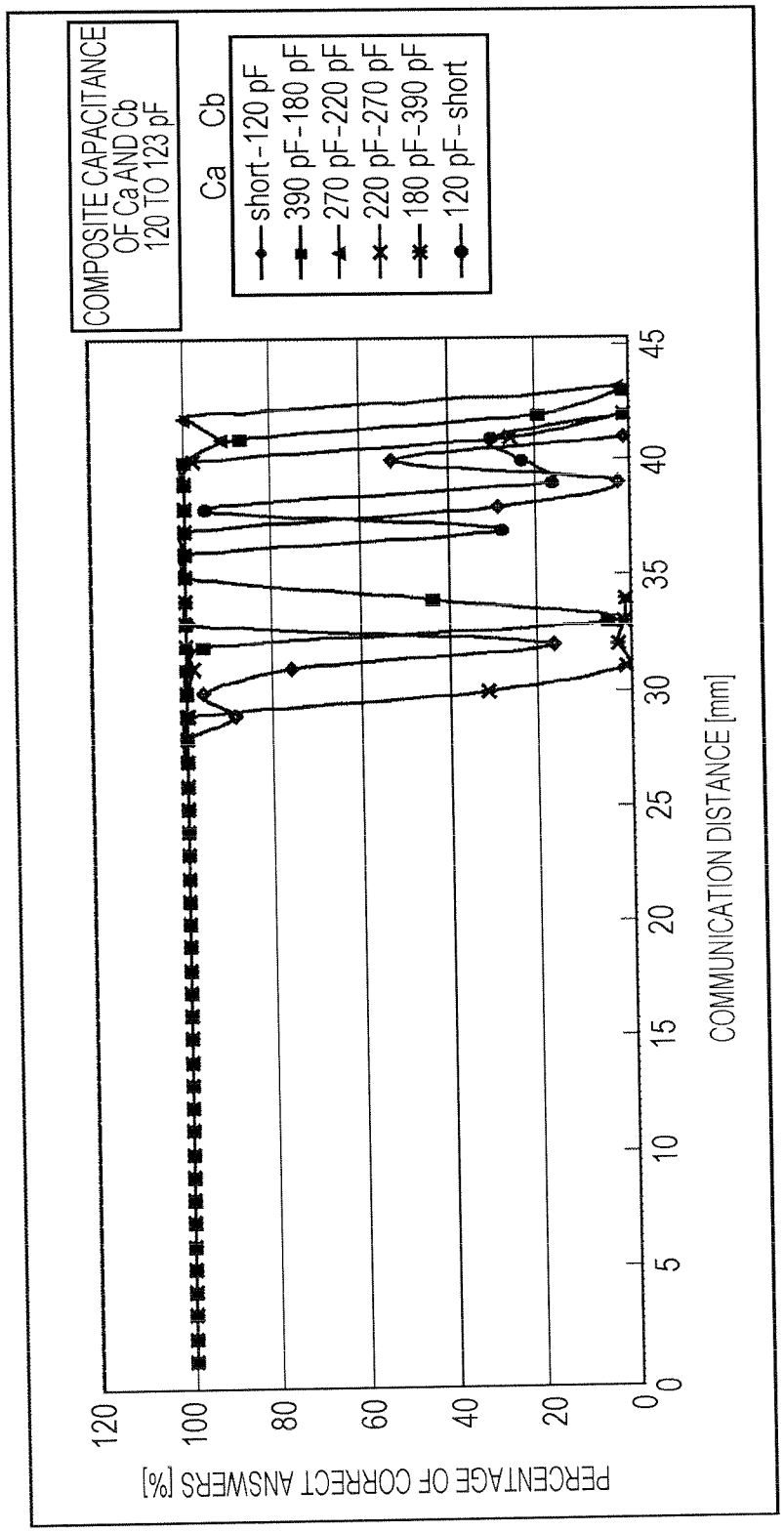
FIG. 9 is a diagram which shows a result of a communication performance of a non-contact IC card.

FIG. 9 is a graph which shows a result of a communication performance with the non-contact IC card 62 when the capacitances of the capacitors Ca and Cb are changed in the reader/writer 61.

In the graph shown in FIG. 9, the horizontal axis denotes a validity (%), and the vertical axis denotes a communication distance [mm]. The composite capacitance of the capacitors Ca and Cb is set to 120 to 123 pF, and in the example in FIG. 9, six types of the capacitance combination of the capacitors Ca and Cb are shown.

That is, a combination of capacitances of the capacitor Ca when being short-circuited, and the capacitor Cb having a capacitance of 120 pF, and a combination of capacitances of the capacitor Ca having a capacitance of 390 pF, and the capacitor Cb having a capacitance of 180 pF are shown from above in order. In addition, a combination of capacitances of the capacitor Ca having a capacitance of 270 pF, and the capacitor Cb having a capacitance of 220 pF, and a combination of capacitances of the capacitor Ca having a capacitance of 220 pF, and the capacitor Cb having a capacitance of 270 pF are shown. A combination of capacitances of the capacitor Ca having a capacitance of 180 pF, and the capacitor Cb having a capacitance of 390 pF, and a combination of capacitances of the capacitor Ca having a capacitance of 120 pF, and the capacitor Cb when being short-circuited are shown.

In a combination of capacitances of the capacitor Ca when being short-circuited, and the capacitor Cb having a capacitance of 120 pF, the validity falls to about 20% when the communication distance is approximately 30 mm, and becomes 100% between 33 mm and 37 mm, however, falls to 0% when the communication distance is approximately 38 mm. In addition, when the composite capacitances of the capacitors Ca and Cb is 120 to 123 pF, and the capacitor Cb is 120 pF, it could be a result of the communication performance of the reader/writer 1 in the capacitor C4 in the related art is used.

When it is a combination of a capacitance of the capacitor Ca of 390 pF, and a capacitance of the capacitor Cb of 180 pF, the percentage of the correct answers falls to 0% when the communication distance is approximately 32 mm, and the percentage becomes 100% between 35 mm and 40 mm, however, it falls to 0% when the communication distance is approximately 43 mm.

When it is a combination of a capacitance of the capacitor Ca of 270 pF, and a capacitance of the capacitor Cb of 220 pF, the percentage of the correct answers falls to 90% when the communication distance is approximately 40 mm, and the percentage becomes 100% approximately 42 mm, however, it falls to 0% when the communication distance is approximately 43 mm.

When it is a combination of a capacitance of the capacitor Ca of 220 pF, and a capacitance of the capacitor Cb of 270 pF, the percentage of the correct answers falls to 0% when the communication distance is approximately 40 mm.

When it is a combination of a capacitance of the capacitor Ca of 180 pF, and a capacitance of the capacitor Cb of 390 pF, the percentage of the correct answers falls to 0% when the communication distance is approximately 30 mm.

When it is a combination of a capacitance of the capacitor Ca of 120 pF, and a capacitance of the capacitor Cb of being short-circuited, the percentage of the correct answers falls to 30% when the communication distance is approximately 36 mm, and the percentage becomes 90% when the communication distance is approximately 37 mm, however, it falls to 20% when the communication distance is approximately 39 mm. Thereafter, the percentage of the correct answers falls to 30% when the communication distance is approximately 41 mm, however, the percentage falls to 0% when the communication distance is approximately 42 mm.

The point at which the maximum communication distance, or the validity drops is different depending on the combination of the capacitances, however, in the results, the best communication performance is given when it is a combination of the capacitance of the capacitor Ca of 270 pF, and the capacitance of the capacitor Cb of 220 pF.

As described above, in the reader/writer, the antenna coil and the resonance circuit are configured, and capacitances of the plurality of capacitors which is connected to the antenna coil in series are set having a better combination in a predetermined range of the composite capacitance. In addition, a signal to the reception circuit is obtained from the terminal between the plurality of capacitors of which the capacitances are set. In this manner, the waveform of the reply signal is close to the ideal waveform as shown in FIG. 4, and as a result, it is possible to improve the communication performance.

Meanwhile, in the communication system 51 in FIG. 2, it is also possible to arbitrarily change the voltage level of the reply signal due to the load modulation which replies to the reader/writer 61 from the non-contact IC card 62.

When the position of the reader/writer and the antenna of the non-contact IC card is changed, the voltage level of the reply signal due to the load modulation is changed, the voltage level becomes extremely small at a position, and as a result, a position is present where the communication performance is worsened.

Figure 10:
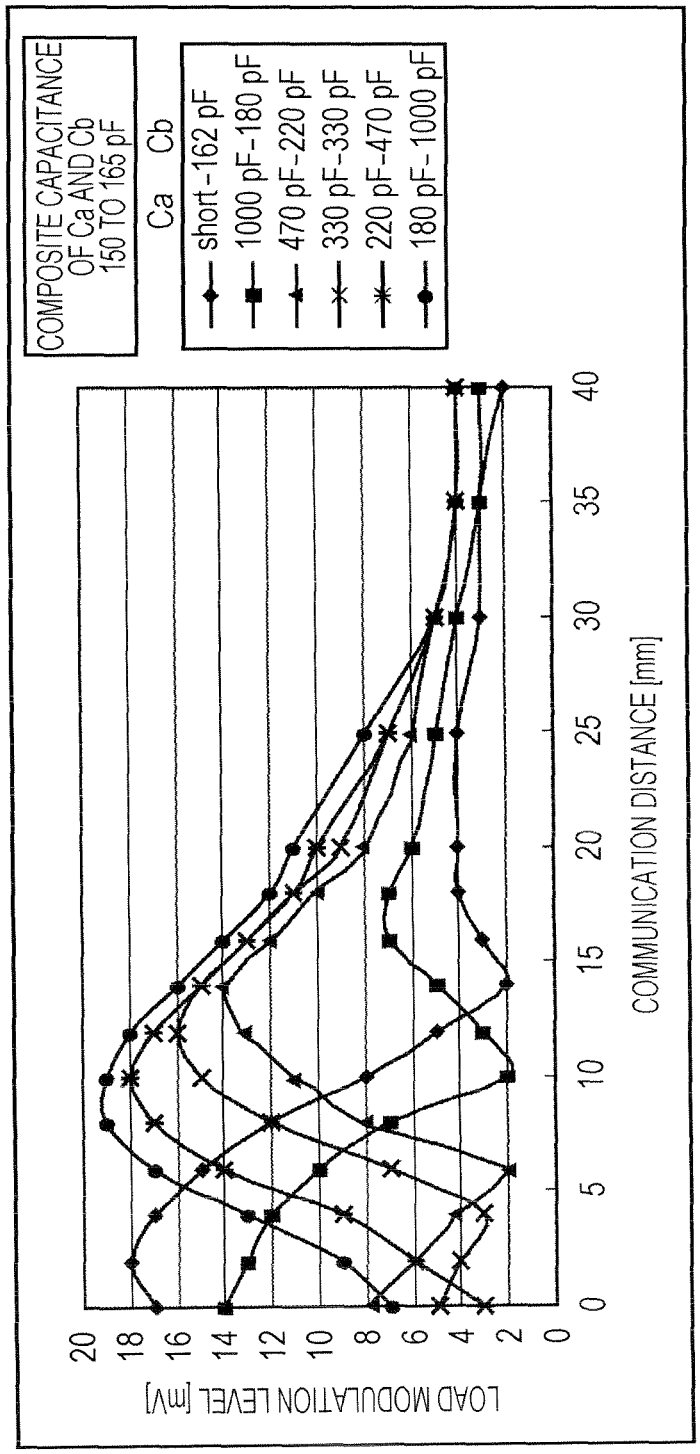
FIG. 10 is a diagram which shows a voltage level of the load modulation.

FIG. 10 is a graph which shows a voltage level of the load modulation when the communication distance is changed in a case where the capacitances of the capacitors Ca and Cb are changed in the reader/writer 61.

In the graph shown in FIG. 10, the vertical axis denotes a load modulation level [mV], and the horizontal axis denotes the communication distance [mm]. The composite capacitance of the capacitors Ca and Cb is set to 150 to 165 pF, and in the example shown in FIG. 10, six types of the capacitance combination of the capacitors Ca and Cb are shown.

That is, a combination of capacitances of the capacitor Ca when being short-circuited, and the capacitor Cb having a capacitance of 162 pF, and a combination of capacitances of the capacitor Ca having a capacitance of 1000 pF, and the capacitor Cb having a capacitance of 180 pF are shown from above in order. In addition, a combination of capacitances of the capacitor Ca having a capacitance of 470 pF, and the capacitor Cb having a capacitance of 220 pF, and a combination of capacitances of the capacitor Ca having a capacitance of 330 pF, and the capacitor Cb having a capacitance of 330 pF are shown. A combination of capacitances of the capacitor Ca having a capacitance of 220 pF, and the capacitor Cb having a capacitance of 470 pF, and a combination of capacitances of the capacitor Ca having a capacitance of 180 pF, and the capacitor Cb having a capacitance of 1000 pF are shown.

In a combination of capacitances of the capacitor Ca when being short-circuited, and the capacitor Cb having a capacitance of 162 pF (that is, a case of the reader/writer 1 in the related art), the load modulation level becomes as high as 18 mV when the communication distance is approximately 2 mm, and becomes gradually low, and then becomes as low as 2 mV when the communication distance is approximately 14 mm.

When it is a combination of capacitances of the capacitor Ca of 1000 pF, and a capacitance of the capacitor Cb of 180 pF, the load modulation level becomes as high as 14 mV when the communication distance is approximately 0 mm, and becomes gradually low, and then becomes as low as 2 mV when the communication distance is approximately 10 mm. In addition, the load modulation level becomes gradually high from the communication distance of 10 mm, and then becomes gradually low after reaching 7 mV when the communication distance is 18 mm.

When it is a combination of capacitances of the capacitor Ca of 470 pF, and a capacitance of the capacitor Cb of 220 pF, the load modulation level is 8 mV when the communication distance is approximately 0 mm, and becomes gradually low, and then becomes as low as 2 mV when the communication distance is approximately 5 mm. In addition, the load modulation level becomes gradually high from the communication distance of 5 mm, and becomes 14 mV when the communication distance is 15 mm, and then becomes gradually low.

When it is a combination of capacitances of the capacitor Ca of 330 pF, and a capacitance of the capacitor Cb of 330 pF, the load modulation level is 5 mV when the communication distance is approximately 0 mm, and becomes gradually low, and then becomes as low as 3 mV when the communication distance is approximately 4 mm. In addition, the load modulation level becomes gradually high from the communication distance of 3 mm, and becomes 16 mV when the communication distance is 12 mm, and then becomes gradually low.

When it is a combination of capacitances of the capacitor Ca of 220 pF, and a capacitance of the capacitor Cb of 470 pF, the load modulation level is 3 mV when the communication distance is approximately 0 mm, and becomes gradually high, and then becomes as high as 15 mV when the communication distance is approximately 10 mm. In addition, the load modulation level becomes gradually low from the communication distance of 10 mm.

When it is a combination of capacitances of the capacitor Ca of 180 pF, and a capacitance of the capacitor Cb of 1000 pF, the load modulation level is 7 mV when the communication distance is approximately 0 mm, and becomes gradually high, and then becomes as high as 19 mV when the communication distance is approximately 9 mm. In addition, the load modulation level becomes gradually low from the communication distance of 9 mm.

As described above, in the reader/writer 1 in the related art, a position of the communication distance is present where the load modulation level becomes extremely small. In contrast to this, in the reader/writer 61, when the capacitances of the capacitors Ca and Cb are changed, the position where the load modulation level becomes small is changed, and a combination of the capacitors Ca and Cb is present in which the communication is not much influenced by the position.

Accordingly, it is possible to make the load modulation level, in a distance in which a stable communication is desired, high, by selecting a combination in which the position where the load modulation level become small does not influence the communication much, among the plurality of combinations of the capacitors Ca and Cb. As a result, it is possible to improve the communication performance in the communication system 51.

Configuration Example of Reader/Writer

Figure 11:
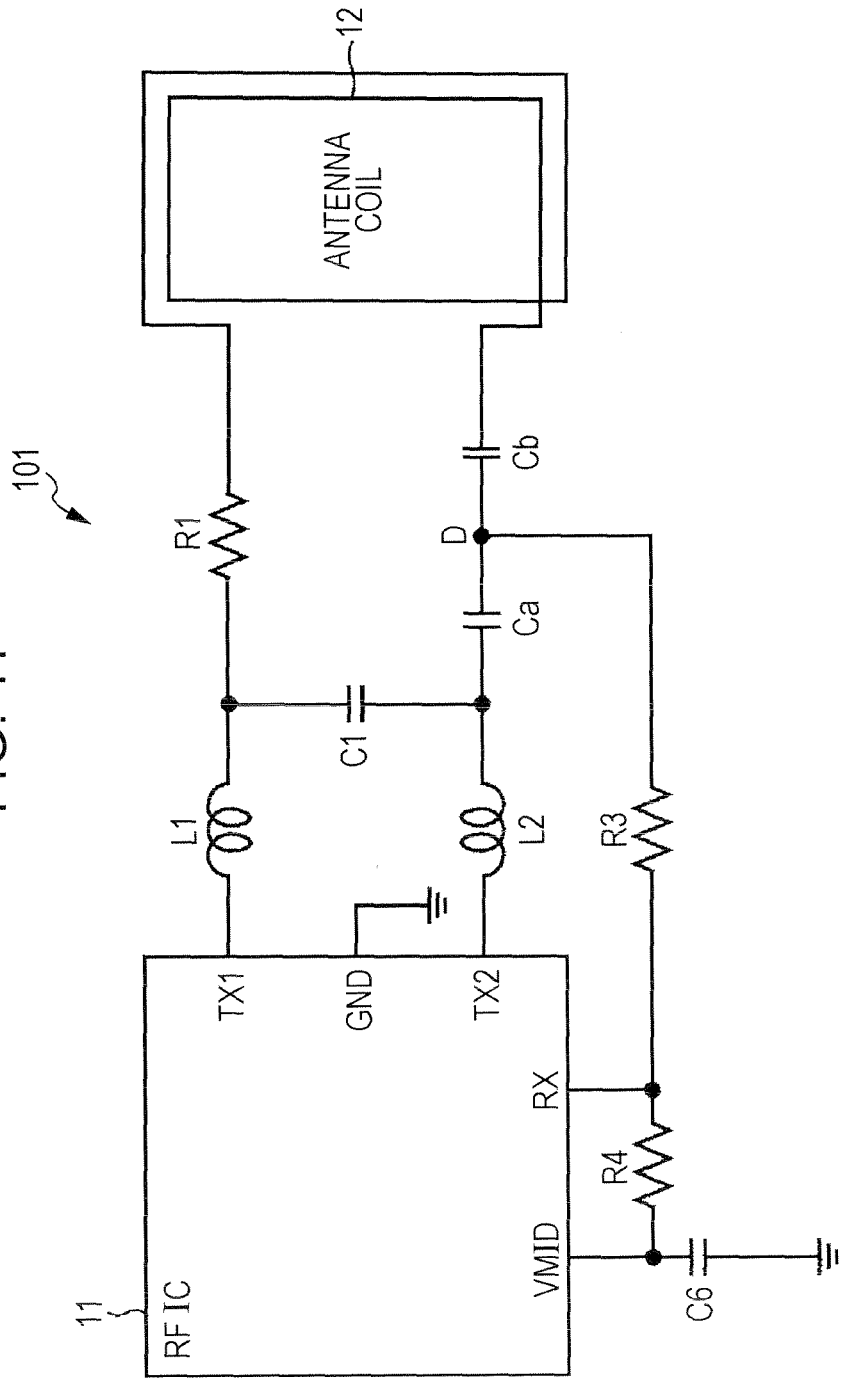
FIG. 11 is a diagram which shows another example of the circuit configuration of the reader/writer.

FIG. 11 shows another example of a circuit configuration of the reader/writer.

A reader/writer 101 shown in FIG. 11 is configured by including the RFIC 11, the coils L1 and L2, the capacitors C1, Ca, Cb, and C6, the resistances R1, R3, and R4, an the antenna coil 12, or the like.

That is, the reader/writer 101 is configured as an example in which components which are necessary for performing antenna adjustment are reduced as much as possible, and is different from the reader/writer 61 in FIG. 3 by omitting the capacitors C2 and C3, and the resistance R2.

On the other hand, the reader/writer 101 is the portions common to the reader/writer 61 in FIG. 3 include the RFIC 11, the coils L1 and L2, the capacitors C1, Ca, Cb, and C6, the resistances R1, R3, and R4, the antenna coil 12. In addition, repeated descriptions regarding these common portions will be appropriately omitted.

The transmission terminals TX1 and TX2 are connected with one end of the coils L1 and L2, respectively. The ground terminal GND is grounded. The other end of the coil L1 is connected with one end of the capacitor C1, and one end of the resistance R1. The other end of the coil L2 is connected with the other end of the capacitor C1 and one end of the capacitor Ca.

The coil L1 is a circuit which has functions of the LPF, and of performing the conversion of impedance (that is, corresponding to the antenna adjusting circuit 73 in FIG. 2), as well as the capacitor C1.

The resistance R1 is connected in series to one end of the antenna coil 12. The other end of the capacitor Ca is connected to one end of the capacitor Cb. The other end of the capacitor Cb is connected in series to the other end of the antenna coil 12. That is, the connection is performed in order of the capacitors Ca, Cb, and the antenna coils 12.

A resonance circuit (that is, corresponding to the resonance circuit 76 in FIG. 2) is configured by the capacitors Ca, Cb, and the antenna coils 12. In addition, the capacitor C1 also aids the resonance.

The reception terminal RX of the RFIC 11 inputs a signal through the resistance R3 from a terminal which is provided at the point D (hereinafter, referred to as a terminal D) which is shown between the capacitors Ca and Cb. A reception circuit 72 decodes the signal which is input from the reception terminal RX based on a middle point potential of a middle point potential terminal VMID.

Even in the reader/writer 101 which is configured as above, a better combination is set in a predetermined range of the composite capacitance, by changing the capacitances of the capacitors Ca and Cb, and the signal from the terminal D which is provided between the capacitors Ca and Cb is input to the reception terminal RX. In this manner, it is possible to change the signal quality which is input to the reception terminal RX. Accordingly, it is possible to improve the communication performance since the optimal reception waveform can be input.

Configuration Example of Reader/Writer

Figure 12:
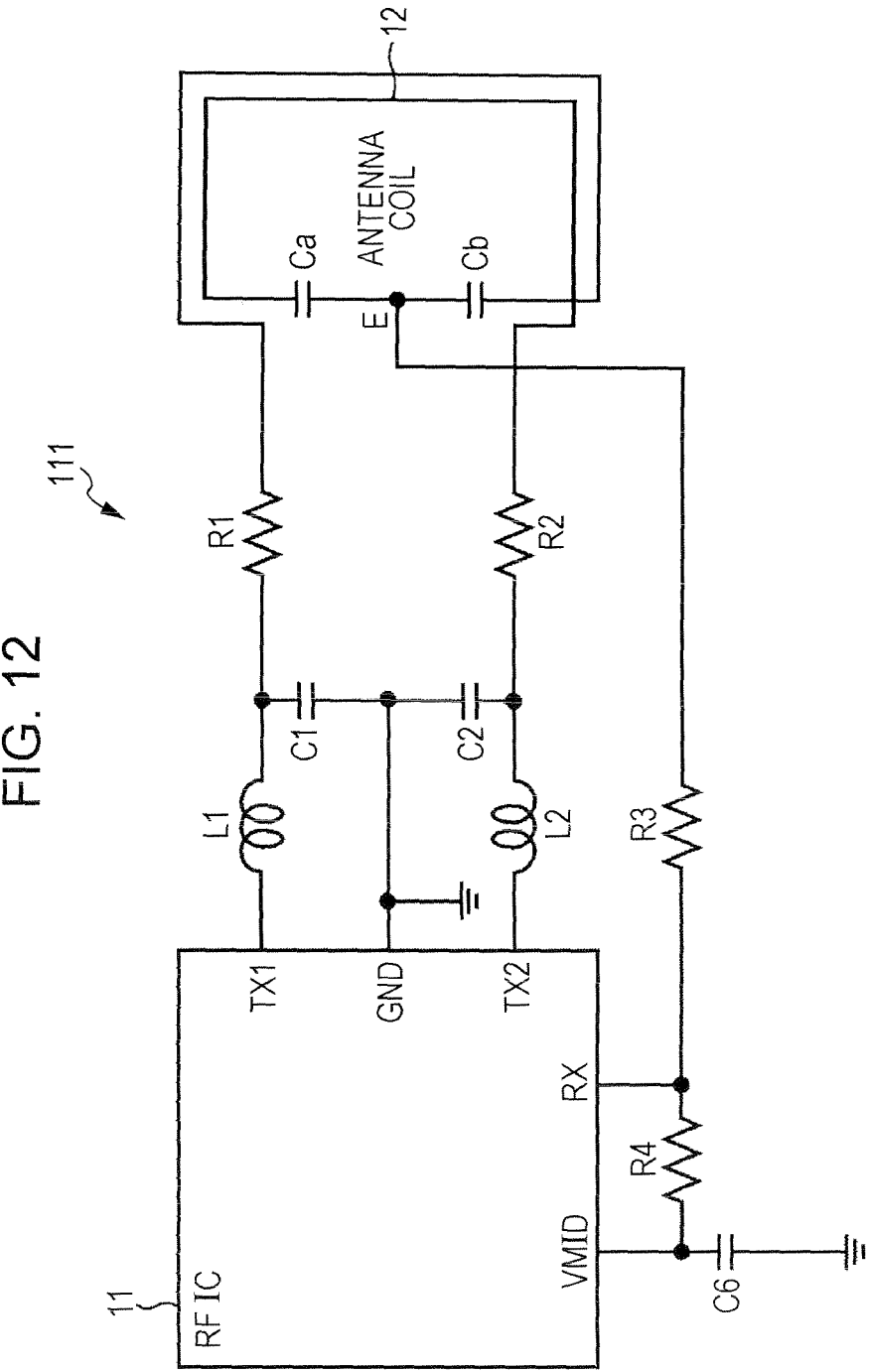
FIG. 12 is a diagram which shows further another example of the circuit configuration of the reader/writer.

FIG. 12 shows a further example of a circuit configuration of the reader/writer.

A reader/writer 111 shown in FIG. 12 is configured by including the RFIC 11, the coils L1 and L2, the capacitors C1, C2, Ca, Cb, and C6, the resistances R1 to R4, the antenna coil 12, or the like.

That is, in the reader/writer 111 the portions common to the reader/writer 61 in FIG. 3 include the RFIC 11, the coils L1 and L2, the capacitors C1, C2, Ca, Cb, and C6, the resistances R1 to R4, and the antenna coil 12. In addition, regarding these common portions, detailed descriptions will be appropriately omitted since the descriptions are repeated.

On the other hand, the reader/writer 111 is different from the reader/writer 61 in FIG. 3 by being provided with the capacitors Ca, Cb in the antenna coil 12, and by omitting the capacitor C3.

The transmission terminals TX1 and TX2 are connected with one end of the coils L1 and L2, respectively. The ground terminal GND is grounded. The other end of the coil L1 is connected with one end of the capacitor C1, and one end of the resistance R1. The other end of the coil L2 is connected with one end of the capacitor C2, and one end of the resistance R2. The other end of the capacitor C1 is connected with the ground terminal GND, and the other end of the capacitor C2.

The coils L1 and L2 are circuits which have functions of the LPF, and of performing the conversion of impedance along with the capacitors C1 and C2 (that is, corresponding to the antenna adjusting circuit 73 in FIG. 2).

The other end of the resistance R1 is connected in series to one end of the antenna coil 12. The other end of the resistance R2 is connected in series to the other end of the antenna coil 12.

In addition, in the reader/writer 111, the capacitors Ca and Cb are provided in the antenna coil 12 (on the antenna coil 12). A resonance circuit is configured by the capacitors Ca and Cb, and the antenna coil 12 (that is, corresponding to the resonance circuit 76 in FIG. 2). In addition, the capacitors C1 and C2 also aid the resonance.

In addition, in the antenna coil 12, a signal is input to the reception terminal RX through the resistance R3 from a terminal which is provided at the point E (hereinafter, referred to as a terminal E) which is shown between the capacitors Ca and Cb. The reception circuit 72 decodes the signal which is input from the reception terminal RX based on a middle point potential of the middle point potential terminal VMID.

Even in the reader/writer 111 which is configured as above, a better combination is set in a predetermined range of the composite capacitance, by changing the capacitances of the capacitors Ca and Cb. In addition, a signal is input to the reception terminal RX from the terminal E which is provided between the capacitors Ca and Cb. In this manner, it is possible to change a quality of the signal which is input to the reception terminal RX. Accordingly, it is possible to improve the communication performance, since the optimal reception waveform can be input.

Configuration Example of Reader/Writer

Figure 13:
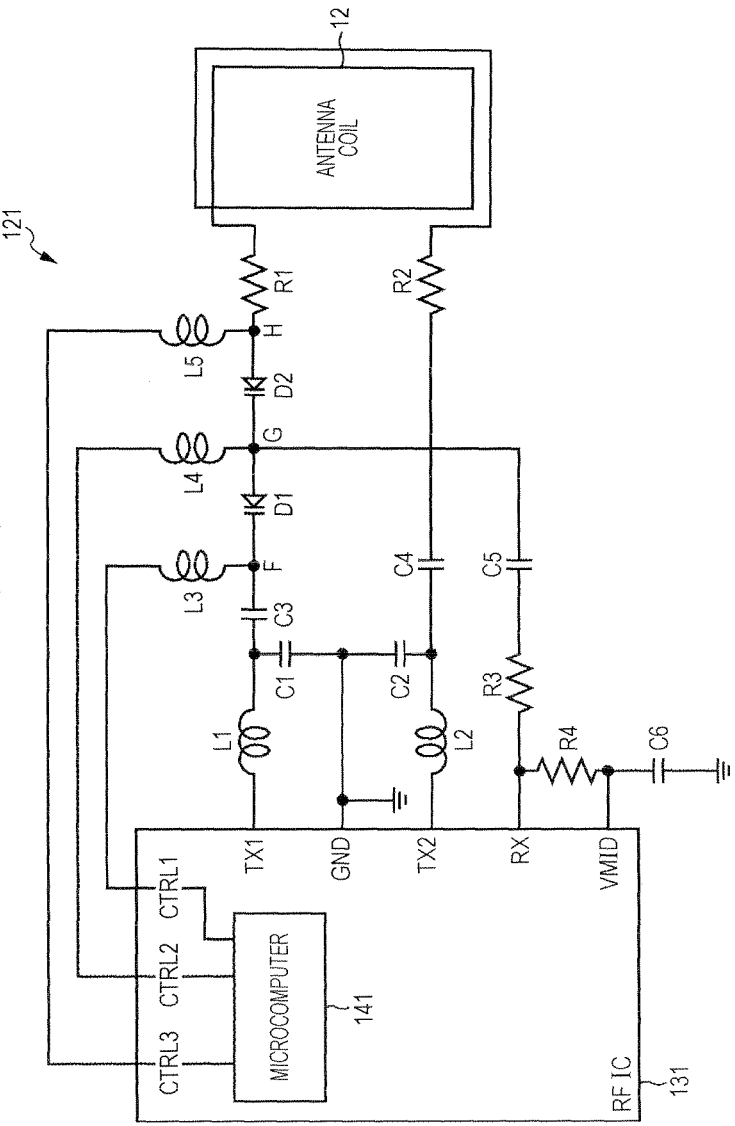
FIG. 13 is a diagram which shows another example of the circuit configuration of the reader/writer.

FIG. 13 shows a further example of a circuit configuration of the reader/writer.

A reader/writer 121 shown in FIG. 13 is configured by including an RFIC 131, the coils L1 and L2, inductors L3 to L5, the capacitors C1 to C6, the resistances R1 to R4, the antenna coil 12, or the like.

That is, in the reader/writer 121 the portions common to the reader/writer 61 in FIG. 3 include the coils L1 and L2, the capacitors C1 to C6, the resistances R1 to R4, and the antenna coil 12. In addition, regarding these common portions, detailed descriptions will be appropriately omitted since the descriptions are repeated.

On the other hand, the reader/writer 121 is different from the reader/writer 61 in FIG. 3 by replacing the RFIC 11 with RFIC 131, by replacing the capacitors Ca and Cb with variable capacitance diodes D1 and D2, and by adding the inductors L3 to L5.

The RFIC 131 builds a microcomputer 141 therein, in addition to the reception circuit and the transmission circuit which are not shown. The RFIC 131 includes the transmission terminals TX1 and TX2, the ground terminal GND, the reception terminal RX, and the middle point potential terminal VMID. In addition, the RFIC 131 includes control terminals CTRLs 1 to 3 which transmit a control signal from the microcomputer 141 to terminals F to H.

The microcomputer 141 controls capacitances of the variable capacitance diodes D1 and D2 corresponding to the capacitors Ca and Cb in FIG. 3 through the control terminals CTRLs 1 to 3. The control terminals CTRLs 1 to 3 are terminals which can output an arbitrary potential.

The transmission terminals TX1 and TX2 are connected with one end of the coils L1 and L2, respectively. The ground terminal GND is grounded. The other end of the coil L1 is connected with one end of the capacitor C1, and one end of the capacitor C3. The other end of the coil L2 is connected with one end of the capacitor C2, and one end of the capacitor C4. The other end of the capacitor C1 is connected with the ground terminal GND, and the other end of the capacitor C2.

The coils L1 and L2 are circuits which have functions of the LPF, and of performing the conversion of impedance along with the capacitors C1 and C2 (that is, corresponding to the antenna adjusting circuit 73 in FIG. 2).

The other end of the capacitor C3 is connected to one end of the variable capacitance diode D1. The other end of the variable capacitance diode D1 is connected to one end of the variable capacitance diode D2. The other end of the variable capacitance diode D2 is connected in series to one end of the coil antenna 12 through the resistance R1. That is, the connection is performed in order of variable capacitance diodes D1 and D2, the resistances R1, and the antenna coil 12. The other end of the capacitor C4 is connected in series to the other end of the antenna coil 12 through the resistance R2.

In addition, the terminal F which is connected to the control terminal CTRL 1 through the inductor L3 is provided between the other end of the capacitor C3 and the one end of the variable capacitance diode D1. The terminal G which is connected to the control terminal CTRL 2 through the inductor L4 is provided between the other end of the variable capacitance diode D1 and one end of the variable capacitance diode D2. The terminal H which is connected to the control terminal CTRL 3 through the inductor L5 is provided between the other end of the variable capacitance diode D2 and one end of the resistance R1.

The variable capacitance diodes D1 and D2 are variable capacitance capacitors in which a change in electrostatic capacitance (junction capacitance) due to a change in the thickness of a PN junction layer of the diode when the voltage is applied to the opposite direction is used. That is, the variable capacitance diodes D1 and D2 can change the capacitances using a potential difference between both ends when applying a reverse bias.

The capacitor C3 is a capacitor for cutting DC (DC component) which sets a potential of the variable capacitance diode D1 to an arbitrary potential to be controlled from the control terminal CTRL 1.

A resonance circuit is configured by the capacitors C3 and C4, the variable capacitance diodes D1 and D2, and the antenna coil 12 (that is, corresponding to the resonance circuit 76 in FIG. 2). In addition, the capacitors C1 and C2 also aid the resonance.

The inductors L3 to L5 are inductors which separate the terminals F to H, and each of control terminals CTRL 1 to 3 in a high frequency manner, respectively, and are elements for suppressing an influence on the antenna when being adjusted.

The reception terminal RX of the RFIC 11 inputs a signal through the capacitor C5 and the resistance R3 from the terminal G which is provided between the variable capacitance diodes D1 and D2. The reception circuit 72 decodes the signal which is input from the reception terminal RX based on a middle point potential of the middle point potential terminal VMID.

In the reader/writer 121 which is configured as above, the microcomputer 141 outputs a potential having a condition of not changing a total capacitance due to each property of the elements of the variable capacitance diodes D1 and D2 from the control terminals CTRL 1 to 3.

In this manner, the reader/writer 121 is able to have the same function as that of the reader/writer 61 in FIG. 3. That is, the reader/writer 121 is able to control the combination of the capacitances of the elements of the variable capacitance diodes D1 and D2, and changes thereof in a range (predetermined range) of the same value as that of the capacitor C4 in FIG. 1 so that the waveform of the reply signal from the non-contact IC card 62 can be easily received by the reception circuit.

Further, the microcomputer 141 stores set values of the combination of capacitances of each capacitor in the storage unit which includes a plurality of patterns with respect to the variable capacitance diodes D1 and D2. In addition, the microcomputer 141 stores information relating to the set values having the optimal combination corresponding to properties of the facing non-contact IC card, or a mobile phone in the storage unit. In addition, the microcomputer 141 detects communication properties of the facing non-contact IC card, or the mobile phone, and selects the optimal setting according to the detected communication properties by performing the communication using the reception circuit and the transmission circuit of the RFIC 131, which are not shown. The microcomputer 141 causes the control terminals CTRL 1 to 3 to output a potential having a condition of being the selected optimal set value from the control terminal CTRLs 1 to 3, and changes the capacitances of the elements of the variable capacitance diodes D1 and D2.

In this manner, a better capacitance combination of the variable capacitance diodes D1 and D2 is set, and a signal from the terminal G which is provided between the variable capacitance diodes D1 and D2 is input to the reception terminal RX. As a result, the optimal reception waveform corresponding to the communication properties of the facing non-contact IC card, or the mobile phone is input to the reception circuit of the reader/writer 121. Accordingly, it is possible to perform a preferable communication by securing the communication performance under a circumstance of performing communication with devices such as the non-contact IC card, or the mobile phone of which the communication properties are different from each other.

As described above, it is possible to easily improve the communication performance with respect to a variety of non-contact IC cards, or mobile phones.

2. Second Embodiment

Configuration Example of Communication System in the Related Art

Figure 14:
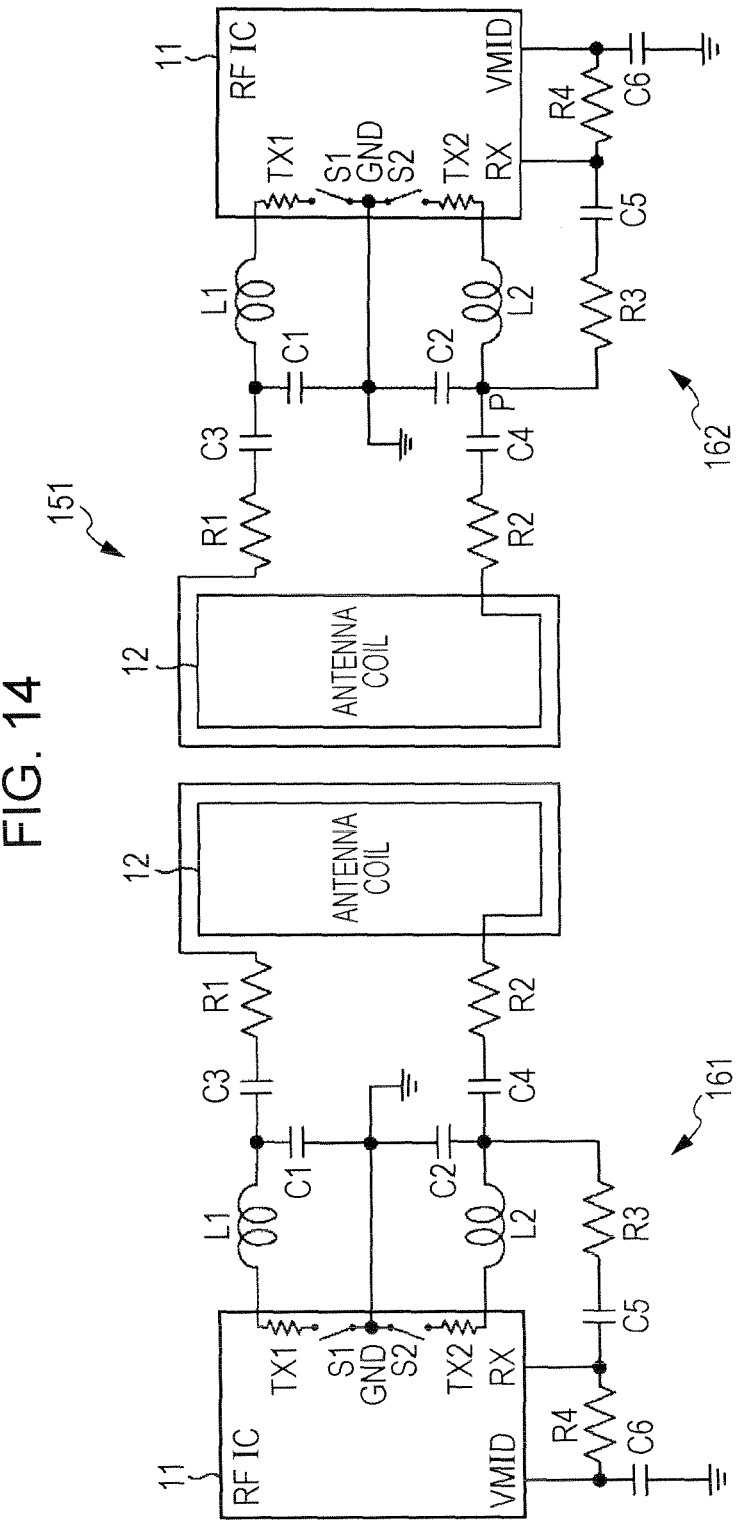
FIG. 14 is a block diagram which shows a configuration example of a communication system in the related art.

For a comparison with the present disclosure, a communication system in the related art will be described with reference to FIG. 14. FIG. 14 shows an example configuration of the communication system in the related art.

A communication system 151 shown in FIG. 14 is a system in which a non-contact communication is performed in a passive communication mode between an initiator 161 as an NFC (Near Field Communication) device and a target 162.

In the example in FIG. 14, the initiator 161 and the target 162 have a circuit which generates a magnetic field similarly to the reader/writer 1 in FIG. 1, and are able to transmit a carrier signal to the other party by generating the magnetic field. In addition, the initiator 161 and the target 162 reply to the other party which sent the carrier signal in the load modulation method similarly to the non-contact IC card which is not shown.

That is, the initiator 161 and the target 162 can also be the reader/writer 1 in FIG. 1, respectively, and can also be the non-contact IC card which is not shown.

Basically, the initiator 161 and the target 162 have the same configuration as that of the reader/writer 1 in the related art in FIG. 1. That is, the initiator 161 and the target 162 respectively includes the coils L1 and L2, the capacitors C1 to C6, the resistances R1 to R4, the RFIC 11, and the antenna coil 12.

Accordingly, the RFIC 11 includes the transmission terminals TX1 and TX2, the ground terminal GND, the reception terminal RX, and the middle point potential terminal VMID. In addition, even though it is omitted in the example of the RFIC 11 in FIG. 1, in the RFIC 11 in FIG. 14, a switch S1 which connects the transmission terminal TX1 and the ground terminal GND, and a switch S2 which connects the transmission terminal TX2 and the ground terminal GND are shown.

The transmission terminals TX1 and TX2 are connected with one end of the coils L1 and L2, respectively. The ground terminal GND is grounded. The other end of the coil L1 is connected with one end of the capacitor C1, and one end of the capacitor C3. The other end of the coil L2 is connected with one end of the capacitor C2, and one end of the capacitor C4. The other end of the capacitor C1 is connected with the ground terminal GND, and the other end of the capacitor C2.

The coils L1 and L2 configure a performance circuit of the LPF (Low Pass Filter), and of performing impedance conversion along with the capacitors C1 and C2.

The other end of the capacitor C3 is connected in series to one end of the antenna coil 12 through the resistance R1. The other end of the capacitor C4 is connected in series to the other end of the antenna coil 12 through the resistance R2. A resonance circuit is configured by the capacitors C3 and C4, and the antenna coil 12. In addition, the capacitors C1 and C2 also aid the resonance.

The resistances R1 and R2 adjust a Q factor (quality factor) of the resonance circuit.

The reception signal RX of the RFIC 11 inputs a signal through the resistance R3 and the capacitor C5 from a terminal P at an intersection point to which one end of the capacitor C4, one end of the capacitor C2, and the other end of the coil L2 are connected. The input signal crosses a middle point potential. The reception circuit decodes the signal which is input from the reception signal RX based on the middle point potential of the middle point potential terminal VMID.

The resistance R3 performs processing of adjusting a level by changing a voltage dividing ratio along with the resistance R4 when a signal level from the terminal P is large. The capacitor C5 cut a difference between the signal from the terminal P (signal from the transmission terminal TX2) and the signal from the middle point potential terminal VMID in a DC manner.

The middle point potential terminal VMID is grounded through the capacitor C6. The capacitor C6 is a bypass capacitor for stabilizing a middle point potential. The middle point potential terminal VMID generates a middle point potential and supplies the middle point potential through the resistance R4.

In such a communication system 151, for example, when the target 162 performs replying with respect to the initiator 161, a load modulation is performed by connecting the transmission terminals TX1 and TX2 to the ground terminal GND by turning ON/OFF the switches S1 and S2.

However, by the turning ON/OFF the switches S1 and S2, DC levels of the transmission terminals TX1 and TX2 are changed, and a DC level of the terminal P is changed, as well, by being influenced by the change.

Figure 15:
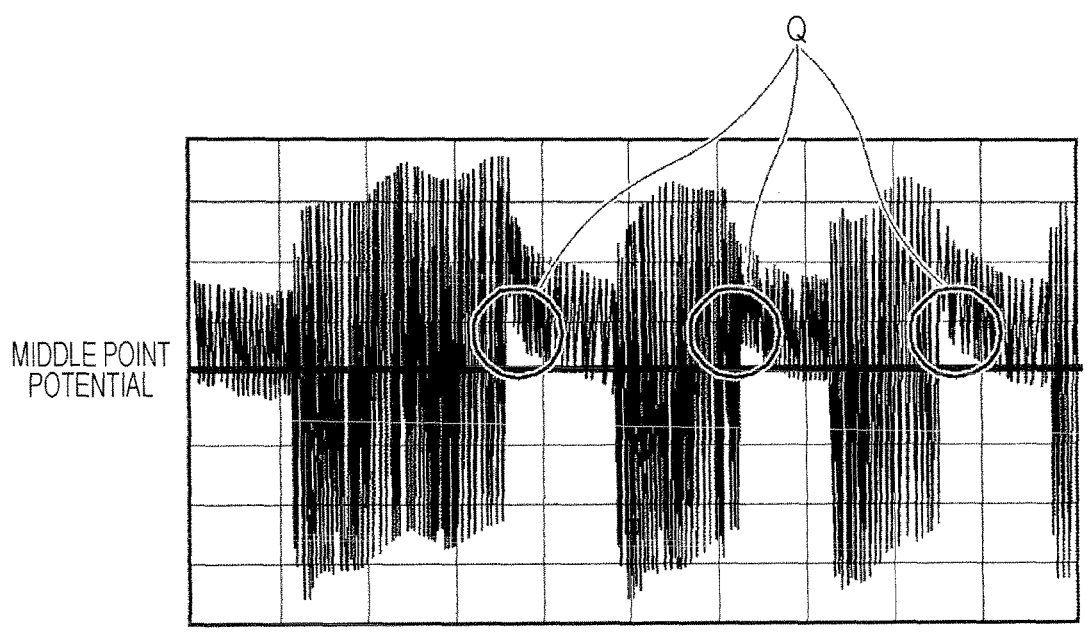
FIG. 15 is a diagram which shows a waveform of a carrier signal of the communication system in the related art.

As a result, a DC level of the reception terminal RX is changed, and portions are generated where the carrier signal does not cross the middle point potential, as shown in FIG. 15, due to the change in the middle point potential of the carrier signal which is input to the reception terminal RX. In this case, the reception circuit of the RFIC 11 of the initiator 161 does not exactly count a clock. For this reason, the length of a packet at the time of replying to the initiator 161 from the target 162 becomes longer than the original length, and the communication fails.

FIG. 15 shows a waveform of a carrier signal in the communication system 151 in the related art. That is, in the example in FIG. 15, in the communication system 151 in the related art, a waveform of a carrier signal when the length of a packet is longer than the original length is shown.

In the waveform in FIG. 15, as shown in circles attached with Q, portions are generated where the carrier signal does not cross the middle point potential. It is difficult for the reception circuit of the RFIC 11 of the initiator 161 to count the clock of the portions surrounded with the circles Q in FIG. 15.

Configuration Example of Communication System of the Present Disclosure

Figure 16:
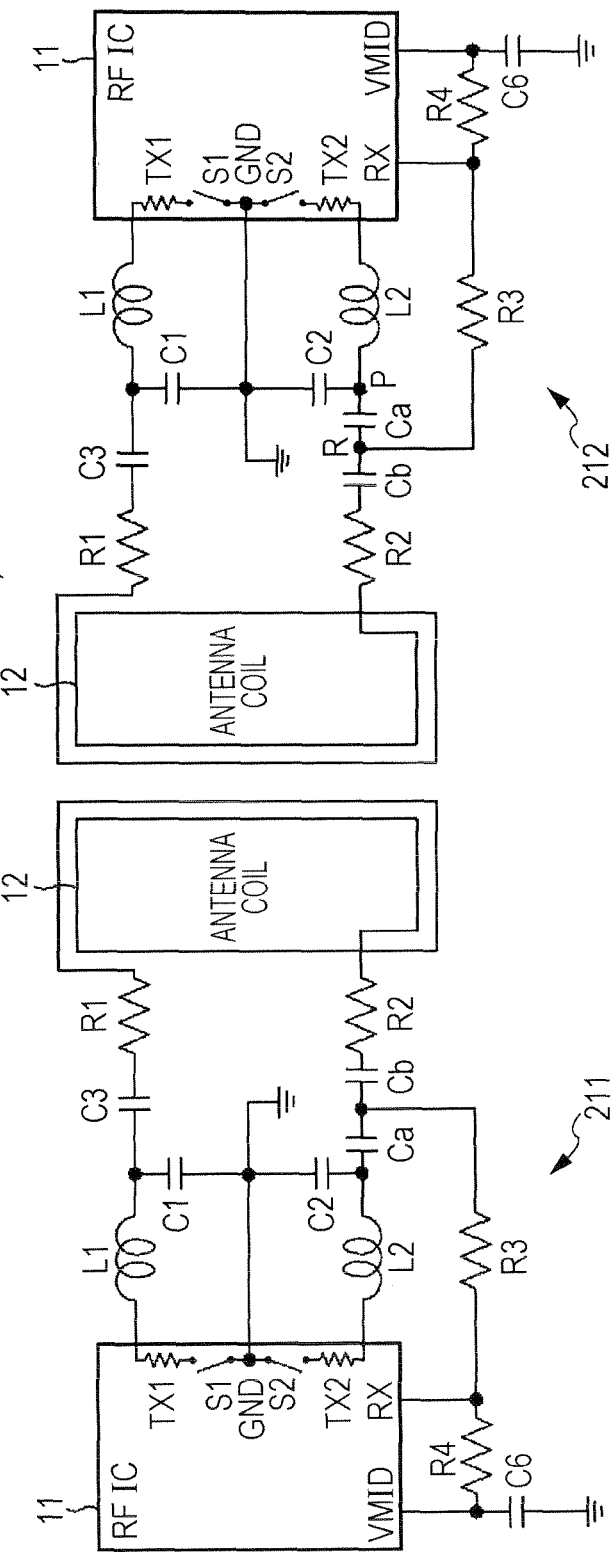
FIG. 16 is a block diagram which shows another configuration example of the communication system to which the present disclosure is applied.

FIG. 16 shows a configuration example of a communication system to which the present disclosure is applied.

A communication system 201 shown in FIG. 16 is a system in which a non-contact communication is performed in a passive communication mode between an initiator 211 as an NFC device and a target 212.

In the example in FIG. 16, the initiator 211 and the target 212 have a circuit which generates a magnetic field similarly to the reader/writer 61 in FIG. 2, and are able to transmit a carrier signal to the other party by generating the magnetic field. In addition, the initiator 211 and the target 212 reply to the other party which sent the carrier signal in the load modulation method, similarly to the non-contact IC card 62 in FIG. 2.

That is, the initiator 211 and the target 212 can also be the reader/writer 61 in FIG. 2, and the non-contact IC card 62 in FIG. 2, respectively.

Basically, the initiator 211 and the target 212 can have the same configuration as that of the reader/writer 61 in FIG. 3. That is, the initiator 211 and the target 212 include the coils L1 and L2, the capacitors C1 to C3, Ca, Cb, and C6, the resistances R1 to R4, the RFIC 11, and the antenna coil 12.

The RFIC 11 includes the transmission circuit and the reception circuit, though not shown, and includes the transmission terminals TX1 and TX2, the ground terminal GND, the reception terminal RX, and the middle point potential terminal VMID. The transmission terminals TX1 and TX2 are terminals which output a signal from the transmission circuit. The reception terminal RX is a terminal for inputting a signal to the reception circuit. In addition, in the RFIC 11 in FIG. 16, a switch S1 for connecting the transmission terminal TX1 and the ground terminal GND to each other, and a switch S2 for connecting the transmission terminal TX2 and the ground terminal GND to each other are shown, though not shown in the example of the RFIC 11 in FIG. 3.

The transmission terminals TX1 and TX2 are connected with one end of the coils L1 and L2, respectively. The ground terminal GND is grounded. The other end of the coil L1 is connected with one end of the capacitor C1, and one end of the capacitor C3. The other end of the coil L2 is connected with one end of the capacitor C2, and one end of the capacitor Ca. The other end of the capacitor C1 is connected with the ground terminal GND, and the other end of the capacitor C2.

The coils L1 and L2 configure a performance circuit of the LPF, and of performing impedance conversion along with the capacitors C1 and C2 (that is, corresponding to the antenna adjusting circuit 73 in FIG. 2).

The other end of the capacitor C3 is connected in series to one end of the antenna coil 12 through the resistance R1. The other end of the capacitor Ca is connected to the other end of the capacitor Cb. The other end of the capacitor Cb is connected in series to the other end of the antenna coil 12 through the resistance R2. That is, the capacitors Ca, Cb, the resistance R2, and the antenna coil 12 are sequentially connected.

A resonance circuit is configured by the capacitors C3, Ca, and Cb, and the antenna coil 12 (corresponding to the resonance circuit 76 in FIG. 2). In addition, the capacitors C1 and C2 also aid the resonance.

The resistances R1 and R2 adjust a Q Factor (quality factor) of the resonance circuit.

The middle point potential terminal VMID is grounded through the capacitor C6. The middle point potential terminal VMID generates a middle point potential, and supplies the middle point potential to the reception terminal RX through the resistance R4.

The reception terminal RX of the RFIC 11 inputs a signal through the resistance R3 from a terminal which is provided at the point R (hereinafter, referred to as the terminal R) which is shown between the capacitors Ca and Cb. The resistance R3 performs processing of adjusting a level by changing a voltage dividing ratio along with the resistance R4 when a signal level from the terminal R is large.

The reception circuit 72 decodes the signal input from the reception terminal RX based on the middle point potential of the middle point potential terminal VMID.

In such a communication system 201, for example, when the target 212 replies to the initiator 211, the load modulation is performed by connecting the transmission terminals TX1 and TX2 to the ground terminal GND by turning the switches S1 and S2 ON/OFF.

By turning the switches 51 and S2 ON/OFF, DC levels of the transmission terminals TX1 and TX2 are changed, and a DC level of the point denoted by P is changed, as well, by being influenced by the change. Therefore, in the target 212, the influence of a change in the DC level of the transmission terminals TX1 and TX2 is reduced in the terminal R by providing the capacitor Ca.

In this manner, in the initiator 211, it is possible to accurately count the clock of the carrier signal which is input to the reception terminal RX, and to suppress an outbreak of malfunction in communication such as lengthening of the length of a packet.

Figure 17:
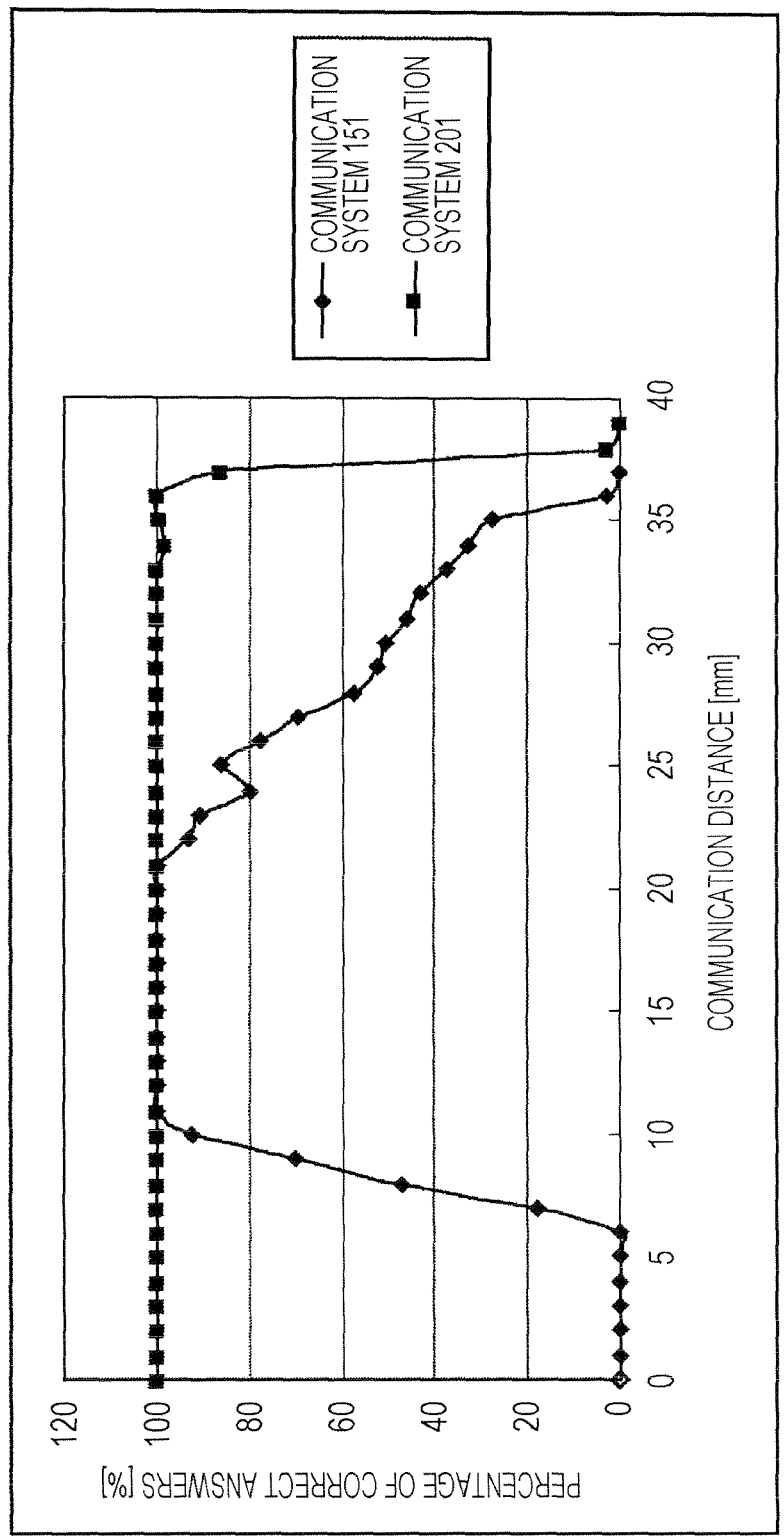
FIG. 17 is a diagram which shows a result of a communication performance by the communication system.

FIG. 17 is a diagram which shows a result of a communication performance in the communication system in the related art, and a communication performance in the communication system in the present disclosure.

In the example in FIG. 17, the horizontal axis denotes a communication distance [mm], and a vertical axis denotes a validity [%].

The validity of the communication system 151 in the related art is 0% when the communication distance is 0 mm to 6 mm. The validity of the communication system 151 in the related art gradually increases up to 100% between the communication distance of 6 mm and 10 mm. In addition, the validity of the communication system 151 in the related art gradually decreases to 0% between the communication distance of 20 mm and 36 mm.

In contrast to this, the validity of the communication system 201 in the present disclosure is 100% between the communication distance of 0 mm and 37 mm, however, suddenly decreases when the communication distance is 38 mm.

That is, in the communication system 151 in the related art, the communication performance is degraded in proximity, and at a distance, however, in the communication system 201 in the present disclosure, the communication distance becomes long without decreasing the validity, compared to the related art.

As described above, even in a communication system between NFC devices, the antenna coil and the resonance circuit are configured, the composite capacitances of the plurality of capacitors which is connected in series to the antenna coil are optimally set, and a signal to the reception circuit is obtained from the terminal between the plurality of capacitors. In this manner, it is possible to further improve the communication performance.

In addition, in the above description, the target 212 has been exemplified, however, the same effect can be obtained even in a case of replying in the initiator 211.

In addition, the embodiment of the present disclosure is not limited to the above described embodiment, and various changes can be made without departing from the scope of the present disclosure.

Hitherto, preferable embodiments of the present disclosure have been described in detail with reference to accompanying drawings, however, the present disclosure is not limited to the examples. It is obvious to those who skilled in the field of technology belonging to the disclosure that various changes, or modifications can be conceived in a category of the technical idea which is disclosed in claims, and naturally, these are understood as those belonging to the technical category of the present disclosure.

The technology can also have the following configuration.

(1) An antenna circuit which includes, a resonant circuit which is configured by at least first and second capacitors, and antenna coils; a transmitter-receiver circuit which has a transmission terminal and a reception terminal; and an adjustment circuit which adjusts an impedance between the resonant circuit and the transmitter-receiver circuit, in which a combination of capacitances of the first and second capacitors is set in a predetermined range of a composite capacitance of the first and second capacitors, and a signal from a terminal which is provided between the first and second capacitors is input to the reception terminal.

(2) The antenna circuit which is disclosed in (1) further includes, a communication unit which performs communication in a non-contact manner with a facing communication device; a storage unit which stores a set value of a combination of capacitances of the first and second capacitors, and information relating to communication properties of the communication device, and the set value; and a control unit which selects the set value of the combination of capacitances of the first and second capacitors based on the communication properties of the facing communication device which is detected by the communication unit.

(3) The antenna circuit which is disclosed in (2), in which the control unit sets the capacitances of the first and second capacitors based on the selected set value of the combination of the capacitances.

(4) A communication device which includes an antenna circuit including, a transmitter-receiver circuit having a transmission terminal and a reception terminal; a resonant circuit which is configured by at least first and second capacitors, and antenna coils; an adjustment circuit which adjusts an impedance between the resonant circuit and the transmitter-receiver circuit, in which a combination of capacitances of the first and second capacitors is set in a predetermined range of a composite capacitance of the first and second capacitors, and a signal from a terminal which is provided between the first and second capacitors is input to the reception terminal.

(5) The communication device which is disclosed in (4), in which the antenna circuit further includes, a communication unit which performs communication in a non-contact manner with a facing communication device; a storage unit which stores a set value of a combination of capacitances of the first and second capacitors, and information relating to communication properties of the communication device, and the set value; and a control unit which selects the set value of the combination of capacitances of the first and second capacitors based on the communication properties of the facing communication device which is detected by the communication unit.

(6) The communication device which is disclosed in (5), in which the control unit sets capacitances of the first and second capacitors based on the selected set value of the combination of the capacitances.

(7) A communication method using an antenna circuit which includes, a transmitter-receiver circuit having a transmission terminal and a reception terminal; a resonant circuit which is configured by at least first and second capacitors, and antenna coils; and an adjustment circuit which adjusts an impedance between the resonant circuit and the transmitter-receiver circuit, the method includes, setting a combination of capacitances of first and second capacitors in a predetermined range of a composite capacitance of the first and second capacitors; and inputting a signal from a terminal which is provided between the first and second capacitors to the reception terminal.

The present disclosure contains subject matter related to that disclosed in Japanese Priority Patent Application JP 2011-226411 filed in the Japan Patent Office on Oct. 14, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An antenna circuit, comprising:
   a resonant circuit comprising at least a first diode, a second diode, and an antenna coil;
   a transmitter-receiver circuit comprising a transmission terminal and a reception terminal;
   a storage unit configured to store a set of values of combination of capacitances of the first diode and the second diode;
   a control unit configured to:
      select a value from the set of values of the combination of the capacitances of the first diode and the second diode; and
      control the capacitances of the first diode and the second diode, based on the selected value, via a plurality of control terminals,
      wherein each of the plurality of the control terminals is connected to a plurality of inductors to control the capacitances of the first diode and the second diode,
      wherein one of the plurality of control terminals is connected to a node between the first diode and the second diode via one of the plurality of inductors, and
      wherein the reception terminal is connected to the node; and
   an adjustment circuit configured to adjust an impedance between the resonant circuit and the transmitter-receiver circuit,
      wherein the combination of the capacitances of the first diode and the second diode is in a range of a composite capacitance of the first diode and the second diode, and
      wherein at least the first diode and the second diode are within the antenna coil.

2. The antenna circuit according to claim 1, further comprising:
   a communication unit configured to communicate in a non-contact manner with a communication device,
   wherein the storage unit is further configured to store information that relates to communication properties of the communication device,
   wherein the control unit is further configured to select the value from the set of values of the combination of the capacitances of the first diode and the second diode based on the communication properties of the communication device, and
   wherein the communication properties are detected by the communication unit.

3. The antenna circuit according to claim 1, wherein the control unit is further configured to select the range of the composite capacitance based on a communication distance between the antenna circuit and a communication device with which the antenna circuit is configured to execute non-contact communication.

4. The antenna circuit according to claim 1, wherein the control unit is further configured to select the range of the composite capacitance based on a value of a voltage that corresponds to a load modulation level.

5. A first communication device, comprising:
   an antenna circuit which includes a transmitter-receiver circuit that has a transmission terminal and a reception terminal;
   a resonant circuit comprising at least a first diode, a second diode, and an antenna coil;
   a storage unit configured to store a set of values of combination of capacitances of the first diode and the second diode;
   a control unit configured to:
      select a value from the set of values of the combination of the capacitances of the first diode and the second diode; and
      control the capacitances of the first diode and the second diode, based on the selected value, via a plurality of control terminals,
      wherein each of the plurality of the control terminals is connected to a plurality of inductors to control the capacitances of the first diode and the second diode,
      wherein one of the plurality of control terminals is connected to a node between the first diode and the second diode via one of the plurality of inductors, and
      wherein the reception terminal is connected to the node; and
   an adjustment circuit configured to adjust an impedance between the resonant circuit and the transmitter-receiver circuit,
      wherein the combination of the capacitances of the first diode and the second diode is in a range of a composite capacitance of the first diode and the second diode, and
      wherein at least the first diode and the second diode are within the antenna coil.

6. The first communication device according to claim 5, wherein the antenna circuit further includes:
   a communication unit configured to communicate in a non-contact manner with a second communication device,
   wherein the storage unit is further configured to store information that relates to communication properties of the second communication device,
   wherein the control unit is further configured to select the value from the set of values of the combination of the capacitances of the first diode and the second diode based on the communication properties of the second communication device, and
   wherein the communication properties of the second communication device are detected by the communication unit.

7. A communication method, comprising:
in an antenna circuit comprising a reception terminal, and a resonant circuit which is configured by at least a first diode, a second diode, and an antenna coil:
storing a set of values of combination of capacitances of the first diode and the second diode;
selecting a value from the set of values of the combination of the capacitances of the first diode and the second diode,
wherein the combination of the capacitances is in a range of a composite capacitance of the first diode and the second diode;
controlling the capacitances of the first diode and the second diode, based on the selected value, via a plurality of control terminals,
wherein each of the plurality of the control terminals is connected to a plurality of inductors to control the capacitances of the first diode and the second diode, and
wherein one of the plurality of control terminals is connected to a node between the first diode and the second diode via one of the plurality of inductors; and
inputting a signal from the node which is between the first diode and the second diode to the reception terminal,
wherein at least the first diode and the second diode are within the antenna coil.

* * * * *